(12) United States Patent
Morita et al.

(10) Patent No.: US 8,479,458 B2
(45) Date of Patent: Jul. 9, 2013

(54) SOLAR CELL MODULE AND SOLAR CELL ARRAY

(75) Inventors: Hiroshi Morita, Mie (JP); Kouji Nishi, Mie (JP); Naoya Itou, Mie (JP); Motofumi Nihara, Mie (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 13/095,812

(22) Filed: Apr. 27, 2011

(65) Prior Publication Data

US 2011/0253201 A1   Oct. 20, 2011

Related U.S. Application Data

(62) Division of application No. 11/908,957, filed as application No. PCT/JP2006/305580 on Mar. 20, 2006, now Pat. No. 7,956,279.

(30) Foreign Application Priority Data

| Mar. 18, 2005 | (JP) | 2005-079769 |
| Mar. 18, 2005 | (JP) | 2005-080313 |
| Jul. 29, 2005 | (JP) | 2005-221974 |
| Sep. 28, 2005 | (JP) | 2005-281969 |
| Nov. 29, 2005 | (JP) | 2005-343623 |

(51) Int. Cl.
   *E04D 13/18*   (2006.01)
(52) U.S. Cl.
   USPC ............................ 52/173.3; 136/251
(58) Field of Classification Search
   USPC ................... 52/173.3, 209, 302.1
   See application file for complete search history.

(56) References Cited

U.S. PATENT DOCUMENTS

| 304,183 A | 8/1884 | Davis ............................ 52/97 |
| 2,905,983 A | 9/1959 | Ritz ............................ 52/209 |

(Continued)

FOREIGN PATENT DOCUMENTS

| JP | 60-103855 | 7/1985 |
| JP | 06-017257 | 3/1994 |

(Continued)

OTHER PUBLICATIONS

European office action dated Feb. 20, 2012 issued in corresponding European application 06729548.5.

*Primary Examiner* — Jeanette E Chapman
*Assistant Examiner* — James Buckle, Jr.
(74) *Attorney, Agent, or Firm* — DLA Piper LLP (US)

(57) ABSTRACT

A reliable solar cell module is provided whereby the liquid is less likely to stay thereon, thus dirt is less likely to occur on the light receiving surface of the solar cell module even in a prolonged use. A solar cell module comprising a solar cell panel, and a module frame. The solar cell module comprising a light receiving surface side member with a light receiving surface: a rear surface side member; and a solar cell element between the light receiving surface side member an the rear surface side member. The module frame fixed to the solar cell panel and surrounding the solar cell panel with its interior surface being abutted with an external peripheral part of the solar cell panel. The module frame comprises a notch extending from its inner part towards its external part in plan view from a side of the light receiving surface side member. The notch member comprises: a first portion on an upper surface of the module frame extending so as to reach an exterior side surface of the module frame, a second portion on the exterior side surface of the module frame connected to the first portion and extending from the upper surface of the module frame so that a lower end of an exterior side surface of the light receiving surface side member is exposed, and a draw part with smallest width.

7 Claims, 34 Drawing Sheets

U.S. PATENT DOCUMENTS

| | | | |
|---|---|---|---|
| 5,460,660 A | 10/1995 | Albright et al. | 136/251 |
| 5,509,973 A | 4/1996 | Ishikawa et al. | 136/251 |
| 5,571,338 A | 11/1996 | Kadonome et al. | 136/251 |
| 6,453,629 B1 | 9/2002 | Nakazima et al. | 52/173.3 |
| 6,465,724 B1 | 10/2002 | Garvison et al. | 136/244 |
| 6,528,718 B2 | 3/2003 | Yoda et al. | 136/251 |
| 6,959,517 B2 | 11/2005 | Poddany et al. | 52/173.3 |
| 2005/0199278 A1 | 9/2005 | Aschenbrenner | 136/251 |
| 2005/0217189 A1 | 10/2005 | Moffitt | 52/209 |
| 2008/0172955 A1 | 7/2008 | McClintock et al. | 52/173.3 |

FOREIGN PATENT DOCUMENTS

| | | |
|---|---|---|
| JP | 06-136896 | 5/1994 |
| JP | 2001-085728 | 3/2001 |
| JP | 2002-094100 | 3/2002 |
| JP | 2002-115372 | 4/2002 |
| JP | 2003-096982 | 4/2003 |
| JP | 2008-235766 | 10/2008 |

(a)

(b)

(a)

(b)

SOLAR CELL MODULE AND SOLAR CELL ARRAY

BACKGROUND OF THE INVENTION

1. Field of the Invention

The present invention relates to a solar cell module and a solar cell array using the same, and more particularly, the present invention relates to the ones whereby the disposability of liquid existing on a light receiving surface of the solar cell module is improved.

2. Related Art

Generally, a solar cell panel has been made by arranging members on a light receiving surface or on the rear surface with a plurality of solar cell elements connected to each other. For such a solar cell panel, a module frame member is mounted to its external peripheral part such that it covers at least its light receiving surface side and the thickness direction of the panel (side surface).

When the solar cell module is installed, a plurality of solar cell modules are electrically connected depending on the amount of light received and the output power where they are installed, the solar cell modules adjacent to each other are placed without any gap therebetween, and the whole solar cell modules are arranged tilted taking a light receiving direction into consideration. Such a plurality of solar cell modules are collectively called a solar cell array.

In such a solar cell module (solar cell array), liquid due to precipitation and so on remains on the light receiving surface. This occurs because the module member having a thickness exists on the light receiving surface of the solar cell module. The liquid that remains in this way subsequently evaporates leaving the dust and so on that were contained in the liquid on the light receiving surface of the solar cell module, thus creating a problem where sunlight is blocked and the electrical output of the solar cell module dramatically drops.

In order to solve the aforementioned problem, it has been proposed to provide a notch having a predetermined opening width on an upper surface portion (light receiving surface portion) of the module frame member of the solar cell module to improve the drainage of the light receiving surface (For example, see Patent Document 1 and Patent Document 2).

Patent Document 1

Japanese Patent Laid-open No. 2002-94100

Patent Document 2

Japanese Patent Laid-open No. 06-17257

SUMMARY OF THE INVENTION

Problem to be Solved by the Invention

However, the solar cell modules described earlier are still unable to provide the sufficient disposability of liquid, leaving dirt on the light receiving surface of the solar cell module, thus greatly decreasing the output of the solar cell module.

On the other hand, even if a notch is provided to the module frame member of the solar cell module, for the solar cell array in which a plurality of solar cell modules are arranged in an inclined direction (vertical direction) in a several rows and the module frame members are abutted without any gap, because liquid existing on solar cell modules at the upper side of the inclination flows down to the solar cell modules at the lower side of the inclination, the solar cell modules in the bottom row get soiled badly, thus degrading the output of the overall solar cell array.

The present invention has been developed in view of the aforementioned problems, and an object of the present invention is to provide the solar cell module whereby liquid on the solar cell module is less likely to stay and accordingly, the light receiving surface of the solar cell modules gets less dirt even in a prolonged use.

Means to Solve the Problem

A solar cell module according to one embodiment of the present invention comprises a solar cell panel comprising: a light receiving surface side member with a light receiving surface: a rear surface side member; and a solar cell element between the light receiving surface side member an the rear surface side member, and a module frame fixed to the solar cell panel and surrounding the solar cell panel with its interior surface being abutted with an external peripheral part of the solar cell panel, wherein the module frame comprises a notch extending from its inner part towards its external part in plan view from a side of the light receiving surface side member, the notch member comprises: a first portion on an upper surface of the module frame extending so as to reach an exterior side surface of the module frame, a second portion on the exterior side surface of the module frame connected to the first portion and extending from the upper surface of the module frame so that a lower end of an exterior side surface of the light receiving surface side member is exposed, and a draw part with smallest width.

In the solar cell module according to another embodiment of the present invention, the second portion extends from the upper surface of the module frame so that a lower end of an exterior side surface of the rear surface side member is exposed.

In the solar cell module according to another embodiment of the present invention, the second portion extends from the upper surface of the module frame so that a lower end of an exterior side surface of the solar cell panel is exposed.

In the solar cell module according to another embodiment of the present invention, a width of the first portion is different from a width of the second portion.

In the solar cell module according to another embodiment of the present invention, wherein the draw part locates at the first portion.

In the solar cell module according to another embodiment of the present invention, wherein a width of the first portion is discontinuous.

A solar cell array of the present invention is configured by arranging a plurality of solar cell modules according to the present invention, wherein the plurality of solar cell modules are tilted to a base for setting.

In the solar cell array according to another embodiment of the present invention is configured by arranging a plurality of solar cell modules according to the present invention, wherein the solar cell modules comprise a first solar cell module and a second solar cell module adjacent to the first solar cell module, and the notch of the first solar cell module is arranged to face the notch of the second solar cell module.

DETAILED DESCRIPTION OF THE PREFERRED EMBODIMENTS

A solar cell module and a solar cell array according to the present invention will be explained in detail with reference to the drawings.

<<First Embodiment>>

Figure 1:
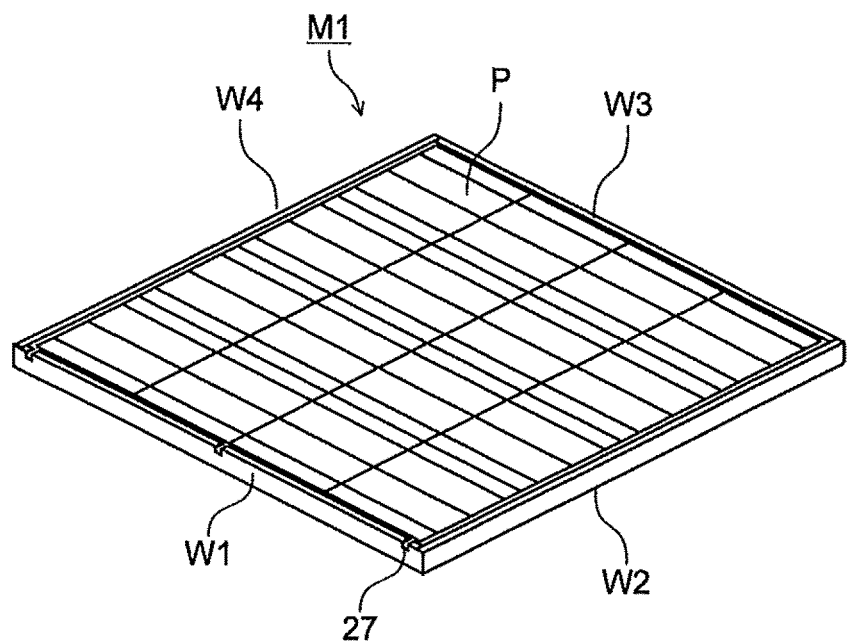
FIG. 1 is an external perspective view of a solar cell module according to the present invention.

FIG. 1 is an external perspective view of a solar cell module according to a first embodiment of the present invention.

A solar cell module M1 comprises solar cell panel P and four module frame members W1 to W4 which are mounted to the external peripheral part of this solar cell panel P.

Figure 2:
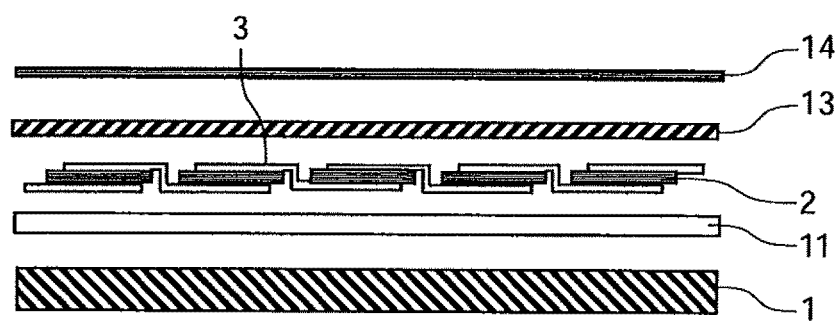
FIG. 2 is a partial exploded view of a solar cell panel according to the present invention.

First, the solar cell panel P will be explained with reference to FIG. 2.

The solar cell panel P comprises a light receiving surface side member 1 that is a light-transmissive substrate, a light receiving surface side sealer 11, a solar cell element 2, a rear surface side sealer 13 and a rear surface side member 14 that is the rear surface sealer. Note that each solar cell element is electrically connected by a connection tab 3. Each structure will be explained in detail below.

A substrate that is comprised of a glass or a polycarbonate resin is used for the light receiving surface side member 1. Examples of the glass may be a white plate glass, tempered glass, double-tempered glass and heat reflecting glass. For example, a white plate tempered glass having the thickness of about 3 mm to 5 mm may be used. When the substrate comprised of a synthetic resin such as a polycarbonate resin is used, the thickness thereof is about 5 mm.

The light receiving surface side sealer 11 and the rear surface side sealer 13 are comprised of an ethylene vinyl acetate copolymer (hereinafter abbreviated as EVA) in a form of sheet having the thickness of about 0.4 mm to 1 mm. These are integrated with the other members by fusing while applying heat and pressure under a reduced pressure by a laminating device. The EVA may be colored in white and so on by containing titanium oxide, pigment and the like. Note that the light receiving surface side sealer 11 may be a transparent material in order to prevent the decrease of an amount of light incident on the solar cell element 2. On the other hand, the rear surface side sealer 13 may be colored in white and the like by containing titanium oxide, pigment and the like so as to match the surrounding environment where the solar cell module is set.

A bulk solar cell element, a thin film solar cell, a compound semiconductor solar cell, etc. may be used for the solar cell element 2. For example, a light receiving surface electrode and a rear surface electrode are formed on a P-N junctioned single crystal or polycrystalline silicon substrate. A plurality of such a solar cell elements 2 are electrically connected to each other. In other words, taking the electrical property outputted from the solar cell module into consideration, a plurality of solar cell modules 2 are electrically connected so that they are in a series-parallel connection. This is implemented by the connection tab 3 between the solar cell elements 2. Normally, a copper foil having the thickness of about 0.1 mm to 1.0 mm and the width of about 2 mm to 8 mm with its entire surface coated with solder is cut to a predetermined length and used for this connection tab 3, and the light receiving surface electrode of one solar cell element and the rear surface electrode of the adjacent solar cell element are connected.

As well as the hard substrate, a laminate sheet in which an aluminum foil and a resin layer are laminated so that water does not permeate may be an example of the rear surface side member 14. The rear surface side member 14 requires the moisture resistance and the weather resistance in addition to the stability of sealing. Moreover, taking the weight saving and the low costs into consideration, a laminate sheet in which a polyethylene terephthalate (PET) sheet, etc. to which a fluorine-based resin sheet, an alumina or a silica is deposited, and an aluminum foil are laminated in multilayer fashion is effective.

The solar cell panel P is made by setting the superposed light receiving surface side member 1, light receiving surface side sealer 11, solar cell elements 2 with the connection tab 3 connected thereto, rear surface side sealer 13 and rear surface side member 14 to a device called laminator, and by integrating the same by applying pressure and heat thereto.

Note that, by connecting one end of the connection tab 3 that is the terminal end, or a lead of another member to an output cable in a terminal box provided at the rear surface of the solar cell panel P, the output of the solar cell panel P is lead out to the outside of the terminal box through the output cable.

Next, the module frame member W1 that is mounted to the external peripheral part of the aforementioned solar cell panel P will be explained with reference to FIGS. 3 to 6.

Figure 3:
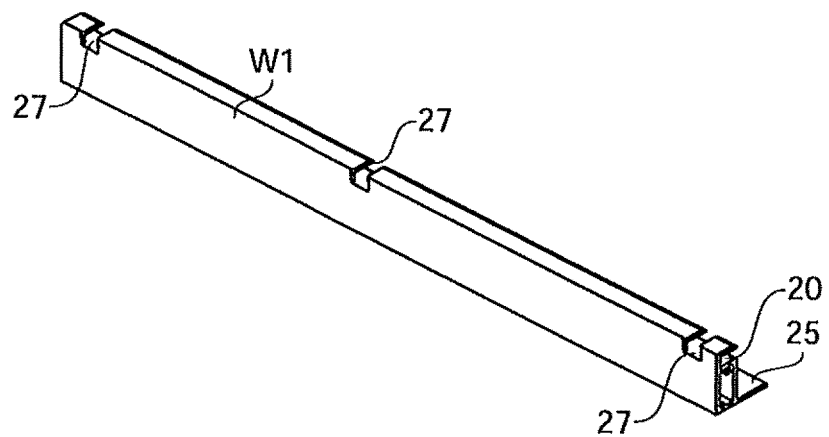
FIG. 3 is an external view of a module frame member according to the present invention.
Figure 4:
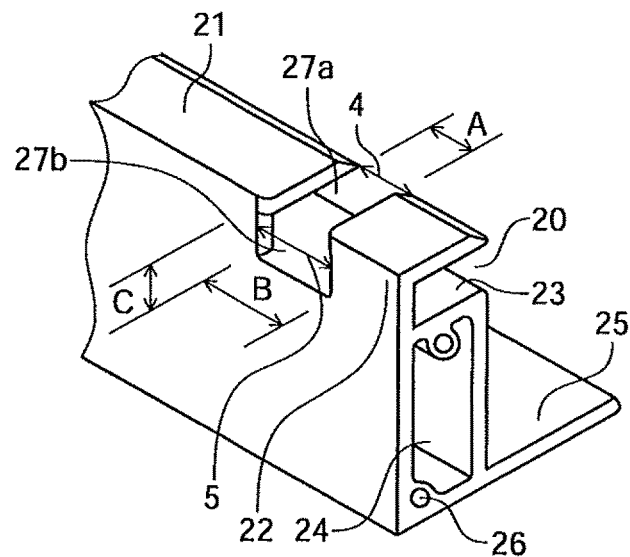
FIG. 4 is a partial enlarged view of the module frame member according to the present invention.
Figure 5:
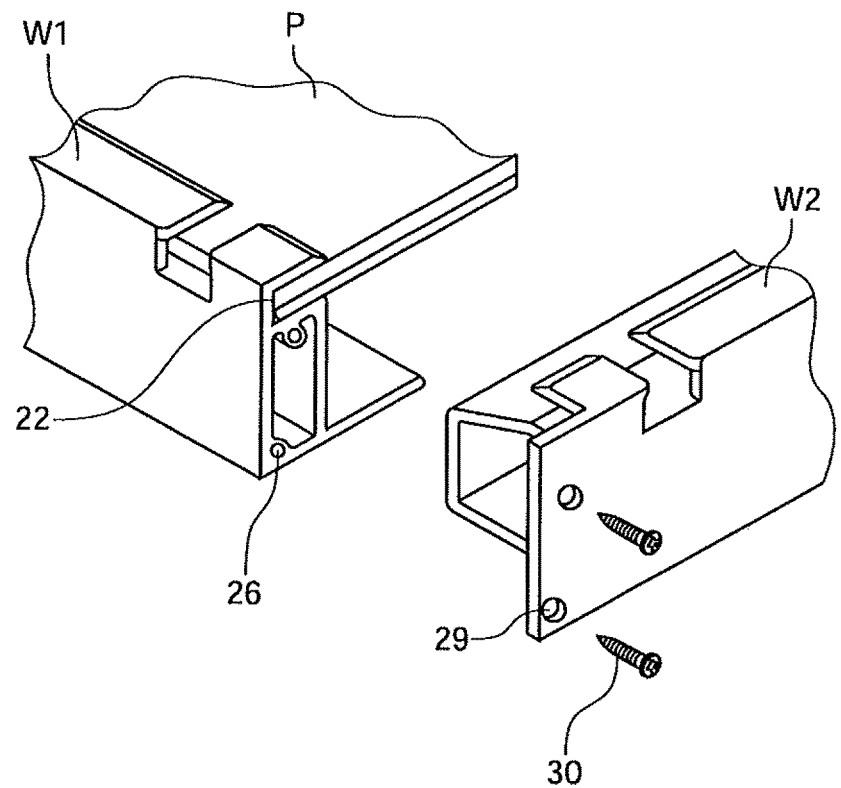
FIG. 5 is a schematic diagram showing that the solar cell panel is fitted into the module frame member according to the present invention and is screwed to the adjacent module frame member.
Figure 6:
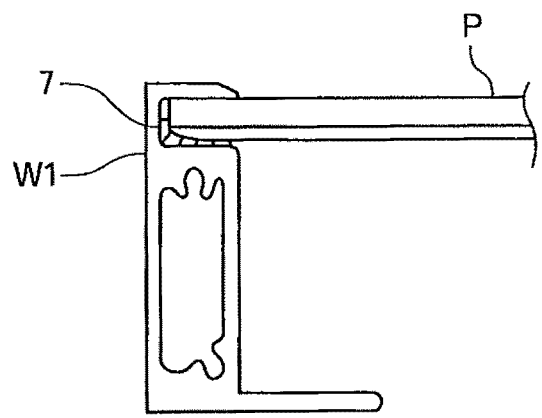
FIG. 6A is a sectional view of a frame part of the solar cell module according to the present invention and is a sectional view of an area in which a notch groove is not formed.
FIG. 6B is a sectional view of a frame part of the solar cell module according to the present invention and is a sectional view of an area in which the notch groove is formed.
Figure 6:
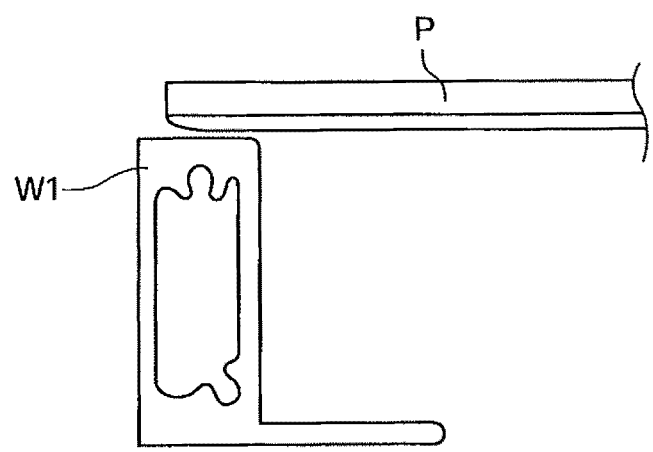

FIG. 3 is an external perspective view of a module frame member W1 that is mounted on the side that comes to the lower side in the inclined direction when the solar cell module M1 is set tilted, among the module frame members W1 that could be mounted to the external peripheral part of the solar cell panel P. FIG. 4 is a partial enlarged view of a notch groove, and FIG. 5 is an external perspective view showing that the solar cell is mounted to this module frame member W1. FIG. 6 is a cross-sectional view of the frame part of the solar cell module according to the present invention.

As shown in the figure, the module frame member W1 is configured to have a mounting portion (inner peripheral part) 20 to which the external peripheral part of the solar cell panel P is mounted, a notch groove 27 and a setting portion 25. The module frame member W1 is often made of aluminum or a resin from the perspective of the strength and costs of the solar cell module M1. When aluminum is used, an alumite treatment or a clear coating is performed on the external surface of the aluminum compact, for example, by the extrusion molding in order to improve the weather resistance.

The mounting portion 20 is for fixing the module frame member W1 to the solar cell panel P such that the module frame member W1 surrounds the solar cell panel P, and comprises an upper surface portion 21, a side surface portion 22 and a bottom surface portion 23. Here, the inner surface of the upper surface portion 21 is configured such that it abuts with or faces the light receiving surface of the end portion of the solar cell panel P, the inner surface of the side surface portion 22 is configured such that it abuts with or faces the end surface of the solar cell panel P in its thickness direction, and the inner surface of the bottom surface portion 23 is configured such that it abuts with or faces the rear surface of the end portion of the solar cell panel P.

The setting portion 25 is provided on the bottom portion of the module frame member W1, and is used to fix the solar cell module M1 to a base (not shown) or to a setting position. And it is provided with a through-hole for a bolt to go therethrough for example, and is fixed to the base or the setting position using a bolt, nut, etc.

Note that a hollow portion 24 is formed between the mounting portion 20 and the setting portion 25, and a screw hole 26 is provided therein to fix a module frame member W2 relative to the module frame member W1 to which the solar cell panel P is mounted as shown in FIG. 5.

The notch groove 27 is for discharging the liquid that resides on the light receiving surface of the solar cell module M1 to the outside, extends from the inner periphery of the upper surface portion 21 of the mounting portion 20 in plan view (the center side of the solar cell panel P) to the external periphery, and is configured so that a terminal end portion 5 is positioned on the side surface portion 22, i.e. the exterior side surface of the module frame member W1. Note that the notch groove 27 may be provided such that it extends to the rear surface side of the solar cell module, and if so, the terminal end portion 5 is positioned at the lower end of the aforementioned exterior side surface.

The forming of the notch groove 27 may be done by cutting the notch groove out by machining or punching it out by pressing to what is extruded or injection molded.

In FIG. 4, when the opening width of a notch 27a of the notch groove 27 on the light receiving surface side (an opening leading to the light receiving surface and an inlet of liquid) is opening width A (a width of a draw part 4), and the opening width of a notch 27b of the notch groove 27 on the exterior side surface side (an opening leading to the side surface and an outlet of liquid) is opening width B (an opening width of the terminal end portion 5), the opening width B is configured to be wider than the opening width A, and the draw part 4 exists such that its opening width becomes minimum towards the inner periphery side compared to the terminal end portion 5 of the notch groove 27. Here, the draw part 4 is a concept indicating a part of the notch groove 27 whose opening width is smallest, and when the smallest opening width part extends for a predetermined length, the draw part 4 indicates its end part. The periphery side indicates an inner periphery part of the module frame member W1 in plan view from the light receiving surface side member side. When the notch groove 27 extends around the module frame member W1 from the light receiving surface side towards the side surface part, the periphery side also indicates a part reversing back in the reverse direction of the extending direction of the notch groove 27.

As for positions to form the notch groove 27, it is preferable that the notch groove 27 is formed at the both ends and the center of the module frame member W1 as shown in FIG. 3 for example.

As mentioned above, the solar cell module according to the present invention has the notch groove 27 on the module frame member W1 in a way that the notch groove 27 extends from the inner periphery to the exterior periphery in plan view viewed from the light receiving surface side and is provided with the terminal end portion 5 on the exterior side surface of the module frame member W1. Because the notch groove 27 is configured to have the draw part 4 in which its opening width becomes smallest towards the inner periphery side compared to the terminal end portion 5, the liquid existing on the light receiving surface of the solar cell module is smoothly moved and discharged to the outside of the solar cell module by passing through the draw part 4 of the notch groove 27, thus reducing the accumulation of the liquid on the light receiving surface of the solar cell panel P. Accordingly, it reduces the dirt and dust contained in the liquid that will be left as dirt on the light receiving surface of the solar cell panel P as the result of the evaporation of the accumulated liquid. As for a mechanism of the discharging of liquid, it is contemplated that because the surface tension of the liquid passing through the notch groove 27 is greater at the inlet side (draw part 4) and smaller at the outlet side (end terminal portion 5), the liquid is swiftly discharged, being pulled from the inlet side (draw part 4) to the outlet side (end terminal portion 5).

As the result of consideration on the opening width A (width of the draw part 4) and the opening width B (width of the terminal end portion 5) by the inventors of the present invention, it was found that it was important that the opening width A (width of the draw part 4) is from 2 mm to 15 mm, and that the opening width B (width of the terminal end portion 5) is made to be greater than the opening width A (width of the draw part 4) by a range from 1 mm to 7 mm, regardless of the inclination angle when installing the solar cell module M1.

By making the opening width A (width of the draw part 4) of the notch groove 27a greater than 2 mm, dirt and dust included in the liquid such as rainwater will not accumulate and the liquid is steadily discharged to the outside. Also, making the opening width A (width of the draw part 4) of the notch groove 27a smaller than 15 mm enables the liquid to be discharged smoothly. It is assumed that this is due to the high hydrophilicity found on the end surface portion of the notch groove 27. In other words, if the opening width A (width of the draw part 4) of the notch groove 27a exceeds 15 mm, the tension that pulls the liquid to the outside along the notch groove 27a due to the high hydrophilicity found on the sidewalls of the notch groove 27a is dispersed, and it becomes smaller than the surface tension of the liquid, and the liquid may remain on the solar cell module M1.

When a height (length in the height direction) C of the notch groove 27b provided on the side surface portion of the module frame member W1 is smaller by less than 2 mm from the surface of the solar cell panel P, the effect is small and there may be a case where the liquid remains on the solar cell module M1 due to its surface tension. Likewise, if the difference exceeds 7 mm, any more effect cannot be expected.

As mentioned above, because a white plate tempered glass having the thickness of 3 mm to 5 mm is often used for the light receiving surface side member 1 for a common solar cell panel P, the notch groove 27 is preferably formed such that it reaches from the light receiving surface to the lower end of the exterior side surface of the solar cell panel P.

Further, it is necessary that the opening width B (width of the terminal end portion 5) of the notch groove 27b provided on the module frame member W1 is greater than the opening width A (width of the draw part 4) of the notch groove 27a provided on the receiving surface portion of the module frame member W1 regardless of the inclination angle when installing the solar cell module. In this way, the liquid on the end surface of the solar cell panel P of the notch groove 27a provided on the receiving surface portion of the module frame member W1 is spread to the left and right at the notch groove 27b provided to the side surface portion due to the high hydrophilicity found between the sidewalls of the notch groove 27. Accordingly, the border area between the notch groove 27a provided on the receiving surface portion provided on the side surface portion and the notch groove 27b will not serve as a resistance and the surface tension on the liquid becomes smaller, thus allowing the liquid to be discharged smoothly.

Further, the size of the opening width B (width of the terminal end portion 5) of the notch groove 27b provided on the module frame member W1 is preferably greater than the size of the opening width A (width of the draw part 4) of the notch groove 27a provided on the receiving surface portion of the module frame member W1 by more than 1 mm but not more than 7 mm. When the difference is less than 1 mm, there may be a case where the effect of discharging the liquid smoothly becomes smaller thus leaving the liquid on the solar cell module M1 depending on the material of the aforementioned module frame and its processing method. Likewise, when the difference exceeds 7 mm, any more effect cannot be expected, rather the strength of the module frame member W1 may decrease. Therefore, by making the difference between the opening width B (width of the terminal end portion 5) of the notch groove 27b provided on the side surface portion and the opening width A (width of the draw part 4) of the notch groove 27a provided on the receiving surface portion from 1 mm to 7 mm, the effect of discharging the liquid on the solar cell module M1 to the outside smoothly will be ensured.

Note that it is more preferable that an inclined portion having a predetermined inclination with respect to the inner periphery of the module frame member is provided on the part of the light receiving surface inner periphery side in order to improve the inflow of the liquid into the notch groove 27. The inclined portion may be integrally configured with the module frame member or may be configured using a separate member.

The module frame member and the solar cell panel P having the aforementioned configurations are fixed to each other in the following manner whereby completing the solar cell module M1.

Namely, an adhesive member 7 such as a butyl rubber and epoxy adhesive is applied all over the inside of the mounting portion 20 for an adhesion and insulation in advance, and the solar cell panel P is fitted thereinto and the module frame member W1 is fixed to the solar cell panel P. Thereafter, the module frame member W1 to which the solar cell panel P is mounted mounts the module frame member W2 to one of the other external peripheral parts of the solar cell panel P, and the module frame member W1 and the module frame member W2 can be firmly fixed by a screw 30 via a screw hole 29 formed on the module frame member W2. In this manner, four module frame members W1 to W4 are fixed to the solar cell panel P.

Note that the adhesive member 7 is interposed between the mounting portion 20 of the module frame member and the solar cell panel P on the non-forming region of the notch groove 27 (FIG. 6A), and is not interposed on the forming region of the notch groove 27 (FIG. 6B). This is done so that the adhesive member 7 does not prevent the liquid flow within the notch groove <Variation of Form of Notch Groove>

A form of the notch groove 27 is not limited to the one in the aforementioned embodiment so long as it is configured to have the draw part 4 towards the inner periphery side rather than the terminal end portion 5. Variations of the notch groove 27 will be explained below with reference to the drawings.

<Variation 1>

Figure 7:
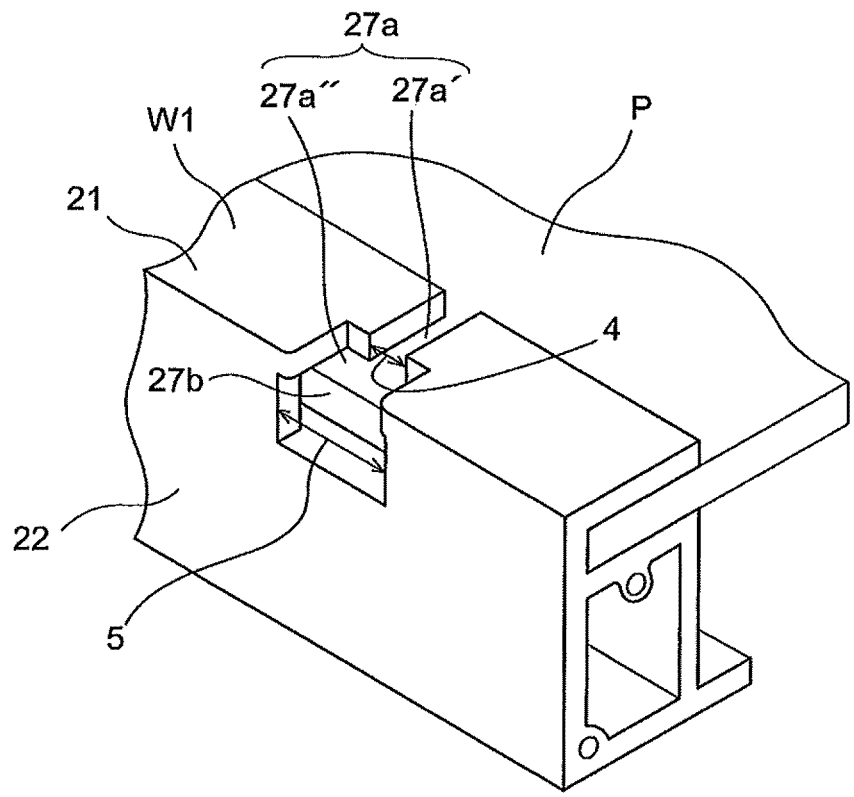
FIG. 7 is a partial enlarged perspective view of a variation of the notch groove.

FIG. 7 is a partial enlarged perspective view of a first variation of the form of the notch groove 27.

Similar to the aforementioned embodiment, the notch groove 27 has the notch groove 27a provided on the light receiving surface side of the module frame member W1, and the notch groove 27b provided on the exterior side surface of the module frame member W1 integral with the notch groove 27a on the light receiving surface side.

The notch groove 27a provided on the light receiving surface side of the module frame member W1 has a notch groove 27a' positioned at the inner peripheral side in plan view (center side of the solar cell panel P), and a notch groove 27a" communicating between the notch groove 27a' and the notch groove 27b provided on the exterior side surface of the module frame member W1. The notch groove 27a" has almost the same or narrower opening width than that of the notch groove 27b provided on the exterior side surface of the module frame member W1. Also, the opening width of the notch groove 27a' positioned at the inner peripheral side in plan view is set to be narrower than the opening width of the notch groove 27a" positioned at the external peripheral side, and is configured with the draw part 4 in order to smoothly guide the liquid existing on the light receiving surface of the solar cell panel P to the outside.

By having such a configuration, the surface tension on the liquid passing through the notch groove 27 is greater at the inlet side (draw part 4) and smaller at the outlet side (terminal end portion 5) and accordingly, the passing liquid is pulled from the inlet side (draw part 4) to the outlet side (terminal end portion 5), thus allowing the liquid to be discharged swiftly. Therefore, dust and dirt contained in the liquid can be removed together with the liquid.

<Variation 2>

Figure 8:
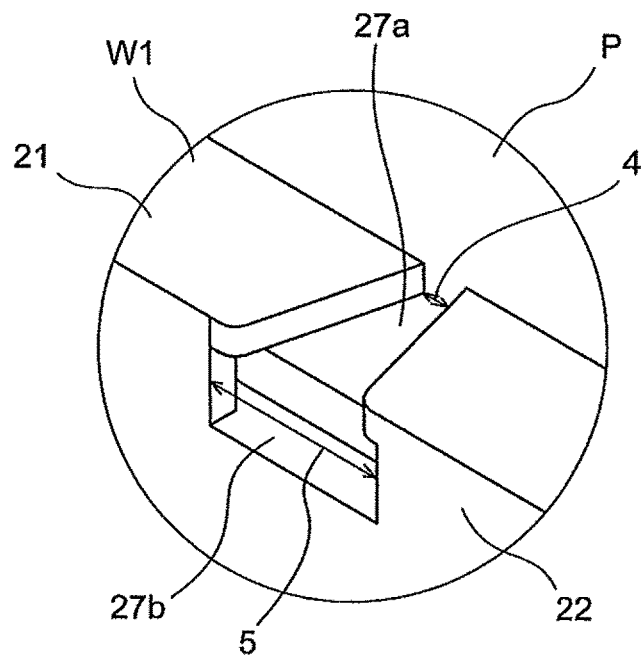
FIG. 8 is a partial enlarged perspective view of a variation of the notch groove.

FIG. 8 is a partial enlarged perspective view of a second variation of the form of the notch groove 27.

Similar to the aforementioned embodiment, the notch groove 27 has the notch groove 27a provided on the light receiving surface side of the module frame member W1, and the notch groove 27b provided on the exterior side surface of the module frame member W1 integral with the notch groove 27a on the light receiving surface side.

The notch groove 27a provided on the light receiving surface side of the module frame member W1 is configured such that its opening width enlarges from the inner peripheral side (center side of the solar cell panel P) towards the external peripheral side in plan view, and has the almost same or narrower opening width than that of the notch groove 27b at the connection part thereto.

In this case, by making the opening width at the most inner peripheral side smallest in plan view of the notch groove 27a, the draw part 4 is configured to smoothly guide the liquid existing on the light receiving surface of the solar cell panel P to the outside.

Accordingly, also for this case, the surface tension on the liquid passing through the notch groove 27 is greater at the inlet side (draw part 4) and smaller at the outlet side (terminal end portion 5) and accordingly, the passing liquid is pulled from the inlet side (draw part 4) to the outlet side (terminal end portion 5), thus allowing the liquid to be discharged swiftly. Therefore, dust and dirt contained in the liquid can be removed together with the liquid.

<Variation 3>

Figure 9:
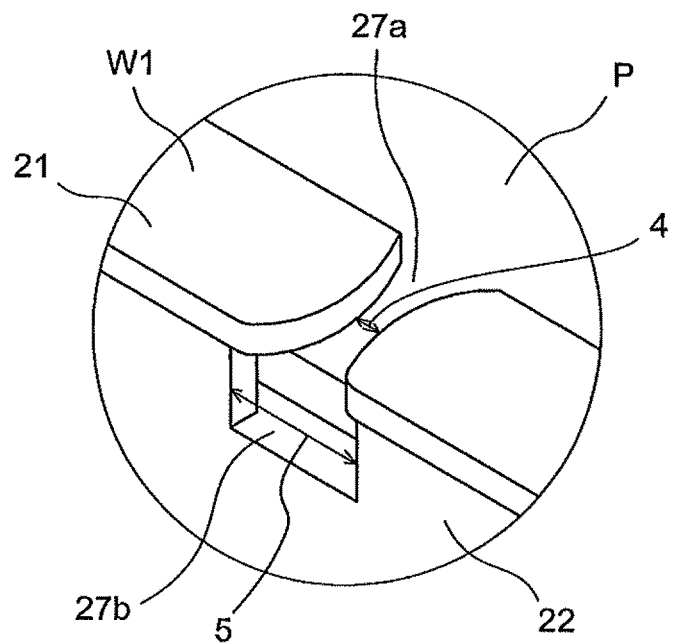
FIG. 9 is a partial enlarged perspective view of a variation of the notch groove.

FIG. 9 is a partial enlarged perspective view of a third variation of the form of the notch groove 27.

Similar to the aforementioned embodiment, the notch groove 27 has the notch groove 27a provided on the light receiving surface side of the module frame member W1, and the notch groove 27b provided on the exterior side surface of the module frame member W1 integral with the notch groove 27a on the light receiving surface side.

The notch groove 27a provided on the light receiving surface side of the module frame member W1 is formed from the inner peripheral side (center side of the solar cell panel P) towards the external peripheral side in plan view, and is configured such that its opening width is smallest at the intermediate part of the notch groove 27. By configuring this notch groove 27a such that its opening width decreases from the most inner peripheral side towards the intermediate part and increases therefrom towards the external periphery in plan view, the draw part 4 is configured to smoothly guide the liquid existing on the light receiving surface of the solar cell panel P to the outside.

Accordingly, also for this case, the surface tension on the liquid passing through the notch groove 27 is greater at the inlet side (draw part 4) and smaller at the outlet side (terminal end portion 5) and accordingly, the passing liquid is pulled from the inlet side (draw part 4) to the outlet side (terminal end portion 5) thus allowing the liquid to be discharged swiftly. Therefore, dust and dirt contained in the liquid can be removed together with the liquid.

<Variation 4>

Figure 10:
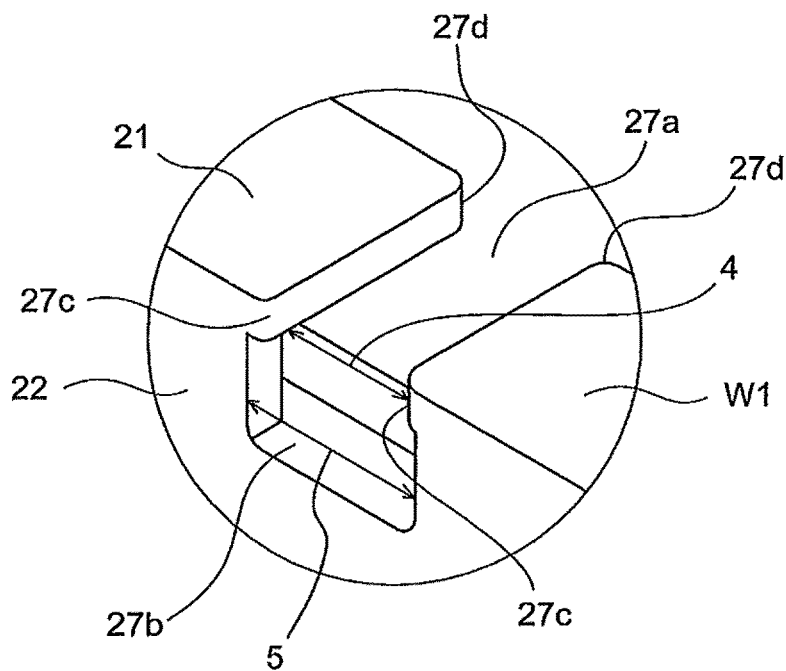
FIG. 10 is a partial enlarged perspective view of a variation of the notch groove.

FIG. 10 is a partial enlarged perspective view of a fourth variation of the form of the notch groove 27.

Similar to the aforementioned embodiment, the notch groove 27 has the notch groove 27a provided on the light receiving surface side of the module frame member W1, and the notch groove 27b provided on the exterior side surface of the module frame member W1 integral with the notch groove 27a on the light receiving surface side.

The notch groove 27a provided on the light receiving surface side of the module frame member W1 is formed from the inner peripheral side (center side of the solar cell panel P) towards the external peripheral side in plan view, and corner portions 27c located at the most external periphery side are chamfered. In this manner, the notch groove 27a provided on the light receiving surface side of the module frame member W1 forms the draw part 4 in which the opening width is narrower at the inner peripheral side than at the external peripheral side in plan view, and the liquid existing on the light receiving surface of the solar cell panel P can be smoothly guided to the outside.

Accordingly, also for this case, the surface tension on the liquid passing through the notch groove 27 is greater at the inlet side (draw part 4) and smaller at the outlet side (terminal end portion 5) and accordingly, the passing liquid is pulled from the inlet side (draw part 4) to the outlet side (terminal end portion 5), thus allowing the liquid to be discharged swiftly. Therefore, dust and dirt contained in the liquid can be removed together with the liquid.

Similar to the aforementioned embodiment, it is possible to configure the opening width of the notch groove 27a provided on the light receiving surface side of the solar cell panel P to be smaller than the opening width of the notch groove 27b provided on the exterior side surface of the solar cell panel P. In this case, the effect of discharging the liquid on the light receiving surface side of the solar cell panel P to the outside smoothly will be improved further.

In addition, the notch groove 27a provided on the light receiving surface side of the solar cell panel P preferably has corner portions 27d that are chamfered whereby the liquid existing on the light receiving surface side of the solar cell panel P is smoothly guided to the notch groove 27 and the discharging effect is enhanced.

<<Second Embodiment>>

A solar cell module according to a second embodiment of the present invention will be explained with reference to FIGS. 11 to 19. Note that the same configurations as those of the first embodiment are assigned the same reference numerals and the explanation therefor is omitted. Characteristic parts of the present embodiment will mainly be explained below.

Figure 11:
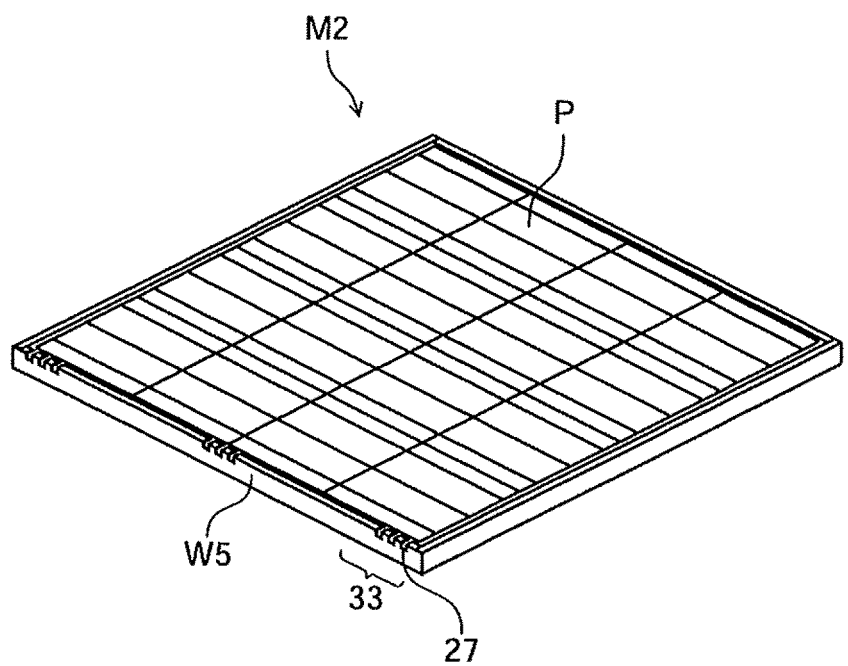
FIG. 11 is an external perspective view of a solar cell module according to a second embodiment of the present invention.

FIG. 11 is an external perspective view of a solar cell module M2 according to a second embodiment of the present invention.

A plurality of the notch grooves 27 similar to that in the aforementioned embodiment are provided to a module frame member W5 of the solar cell module M2 at its both ends and at the center. By providing a notch groove group 33 comprising a plurality of notch grooves 27 at the both ends and the center of the module frame member W5, the liquid during or after rain can be smoothly discharged even for a large-sized solar cell module such as the solar cell module M1 with each side exceeding 70 cm, thus dirt is less likely to remain on the light receiving surface of the solar cell panel P due to the accumulation of the liquid. The number of notch grooves 27 that make up the notch groove group 33 is three in FIG. 11 but is not limited thereto, and it is needless to say that the number of notch grooves may be two, four etc. as necessary in accordance with the length of a side of the solar cell module M2.

Figure 12:
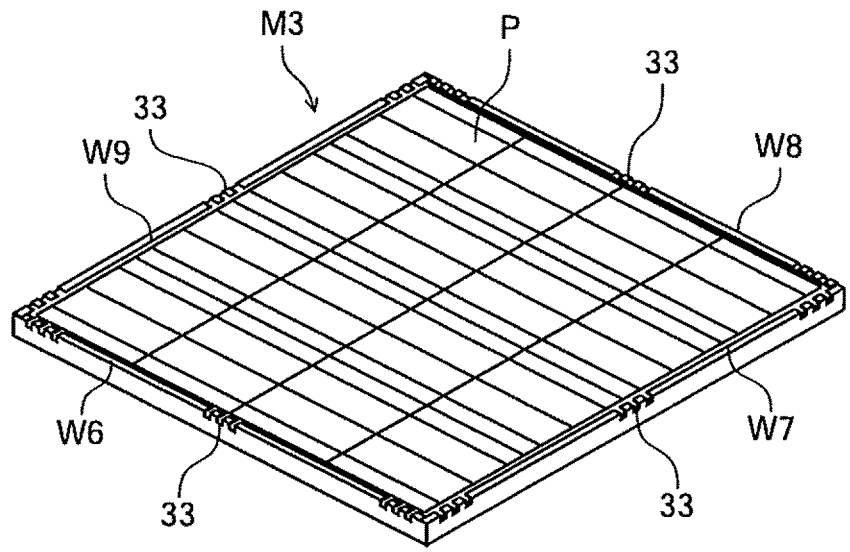
FIG. 12 is an external perspective view of a solar cell module according to a variation of the second embodiment of the present invention.
Figure 13:
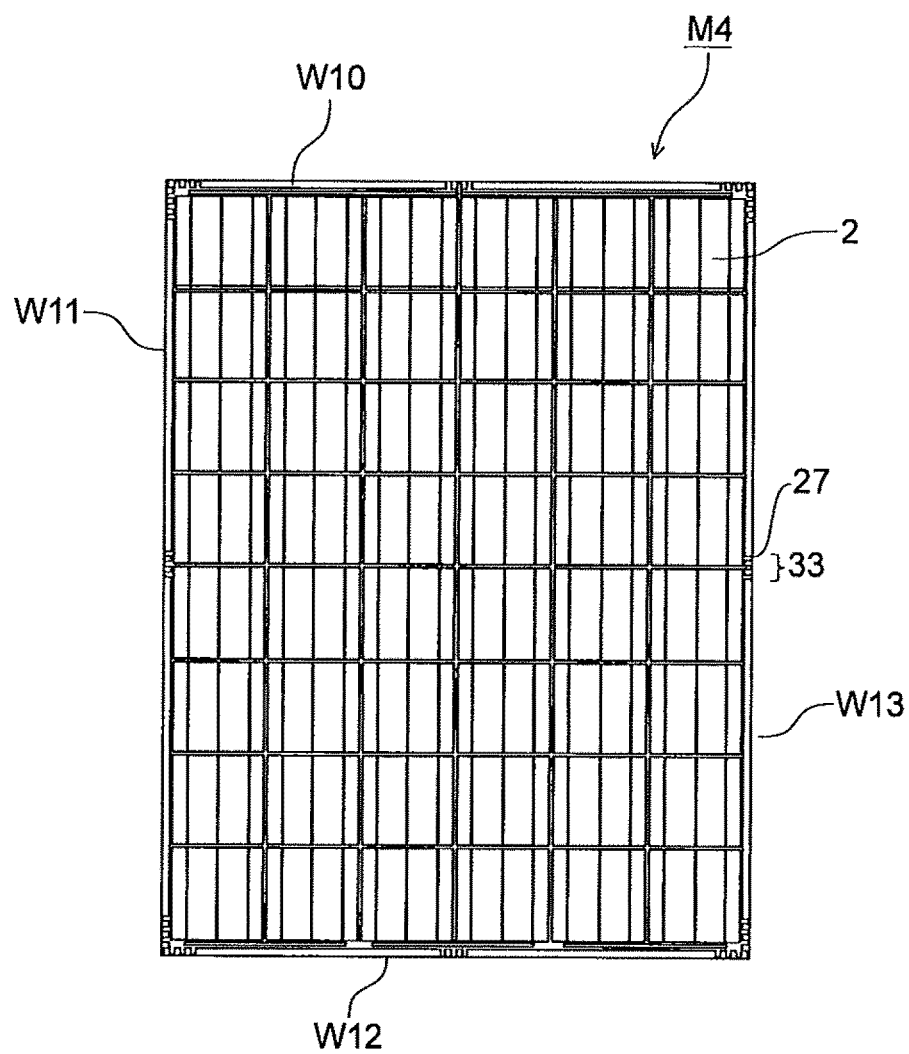
FIG. 13 is a plan view of another variation of the present invention.

FIG. 12 is an external perspective view of a solar cell module M3 according to another variation.

For the solar cell module M3, the notch groove group 33 comprising a plurality of notch grooves 27 is provided to module frame members W6 to W9 each of which is a side of the solar cell module M3. In this manner, no matter in which direction the solar cell module M3 is set, the notch groove group 33 will be present on the module frame members W6 to W9 one of which comes to the lower side in the inclined direction of the aforementioned solar cell module M3, thus enhancing the design flexibility when setting the same.

A solar cell module M4 which is in a rectangular shape configured by such a solar cell module will be explained with reference to FIGS. 13 to 16.

For the solar cell module M4, 48 solar cell elements 2 are arranged in a matrix and the notch groove group 33 comprising three notch grooves 27 is formed at the both ends and the center of each of the sides of module frame members W10 to W13. In this manner, no matter in which direction the solar cell module M4 is set, the notch groove group 33 can be positioned on the module frame member in the lower side of the inclined direction of the aforementioned solar cell module M4, thus enhancing the design flexibility when setting the same.

Figure 14:
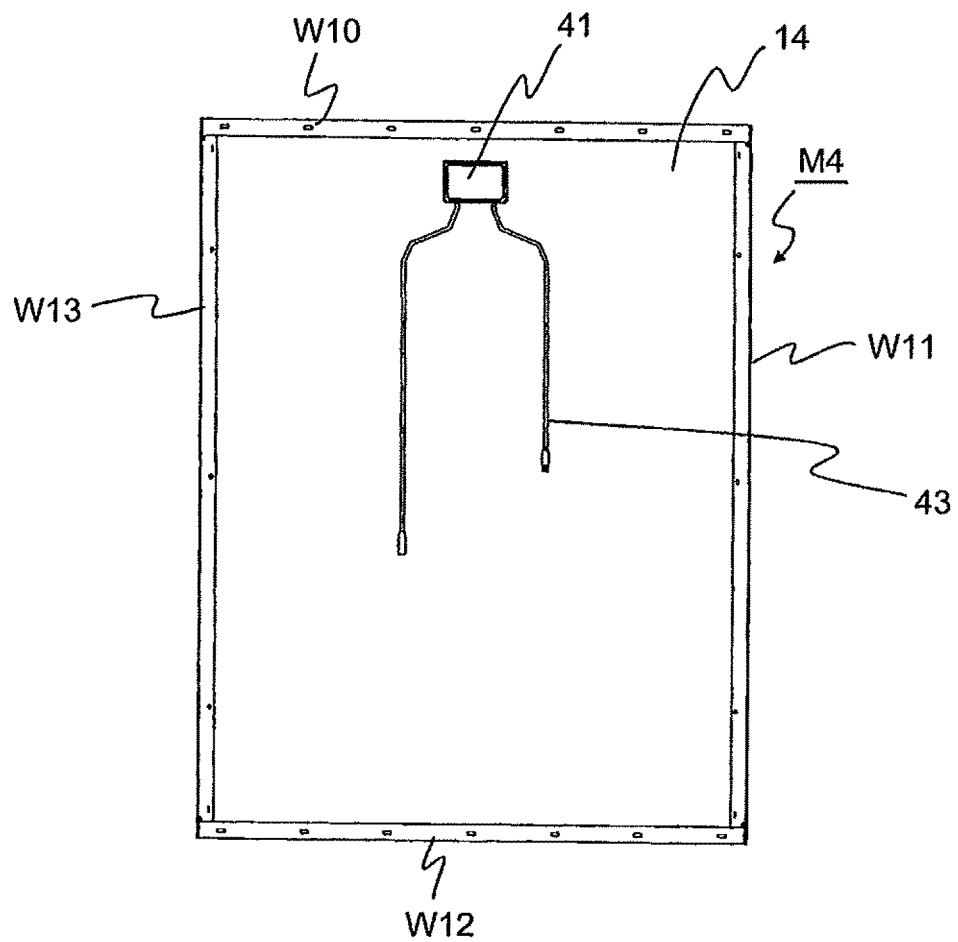
FIG. 14 is an explanatory diagram showing its rear surface side.
Figure 15:
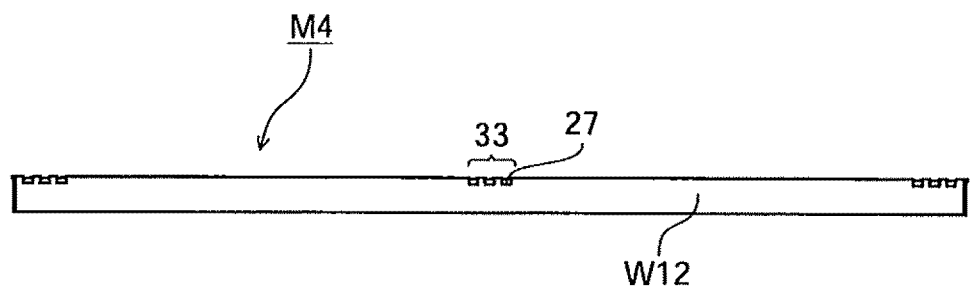
FIG. 15 is an explanatory diagram showing its side surface.
Figure 16:
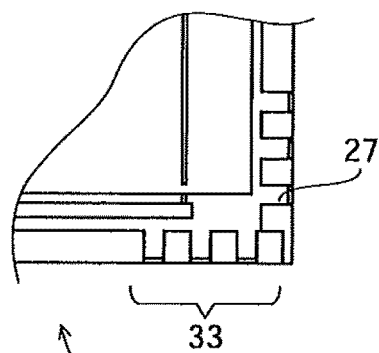
FIG. 16 is its main part enlarged view.
Figure 16:
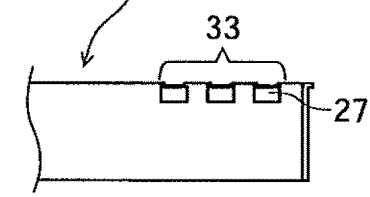

As shown in FIG. 14, the rear surface side member 14 configured with the weather resistance member is exposed on the rear side of the solar cell module M4, and a terminal box 41 is fixed to an appropriate position thereon. A connection line 43 for taking power is drawn out from the solar cell element and is connected to the terminal box 41.

As mentioned earlier, by forming a notch groove group 33 at a plurality of positions of the solar cell module M4, these positions as a whole present geometric beauty with regularity. In addition, when the solar cell module M4 having the module frame members W10 to W13 is set on roofs of a plurality of houses, and when it rains thereon, the liquid mostly flows into the notch groove group 33 and the liquid in each notch groove 27 sparkles depending on the light condition, which creates many spots of light that give the solar cell module M4 a glittering beauty.

Note that the number of solar cell elements 2 that make up the solar cell module is not limited to 48, and it is needless to say that the number thereof may be 36, 54, etc. as necessary.
<Variation>

Figure 17:
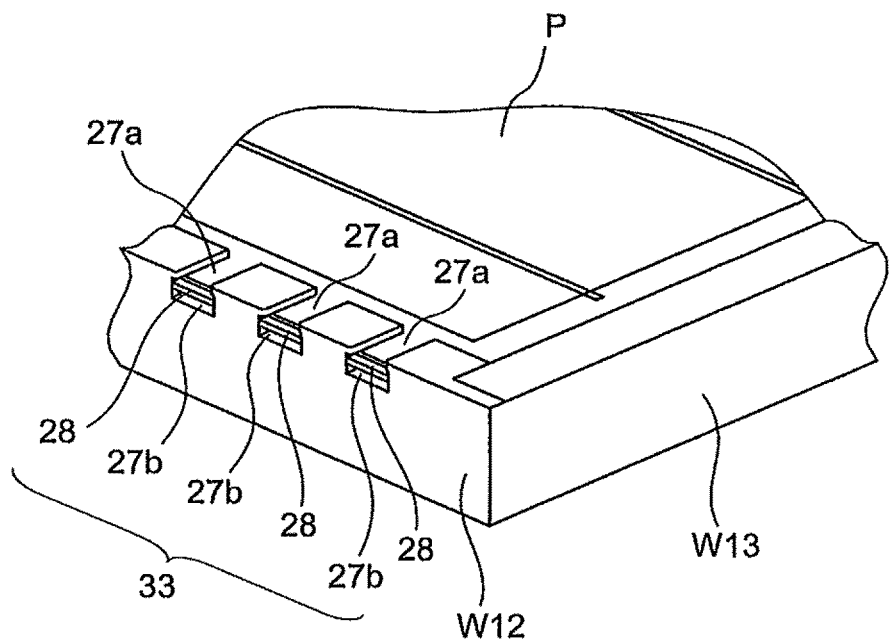
FIG. 17 is a perspective view explaining a reinforcement structure of a notch groove.
Figure 18:
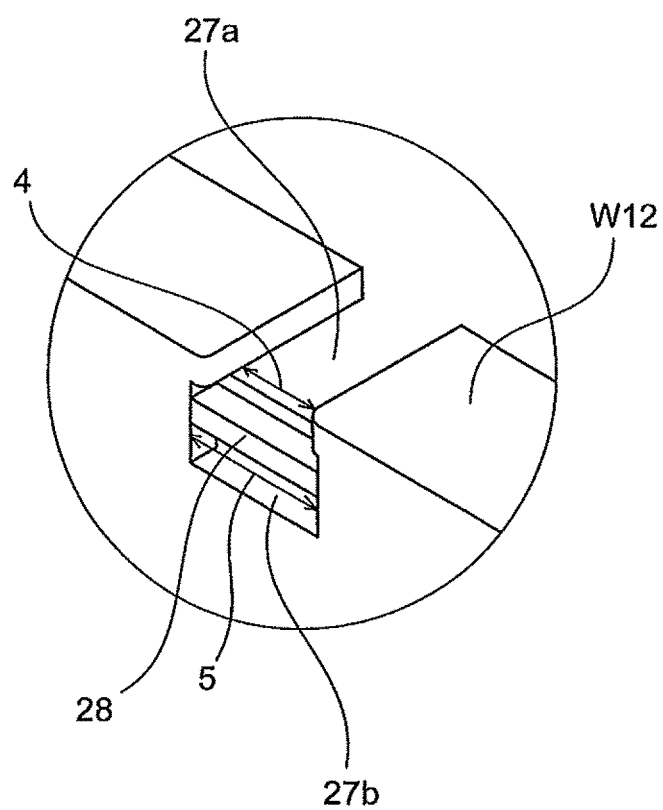
FIG. 18 is its main part enlarged perspective view.

Here, it is preferable that a predetermined reinforcement member is formed on the notch groove 27 in view of improving the strength of the module frame member. As one example of such a reinforcement member, a structure shown in FIGS. 17 and 18 is preferable where a reinforcement portion 28 is provided to the notch groove 27b formed on the exterior side surface side of a module frame member W12 such that it extends across the opening portion of the notch groove 27b. This reinforcement portion 28 is formed integral with the module frame member W12 and it may be formed in the entire thickness direction of the module frame member W12, or may be formed such that a gap is provided between it and the external end surface of the solar cell panel P that is interlocked with the module frame member W12.

Figure 19:
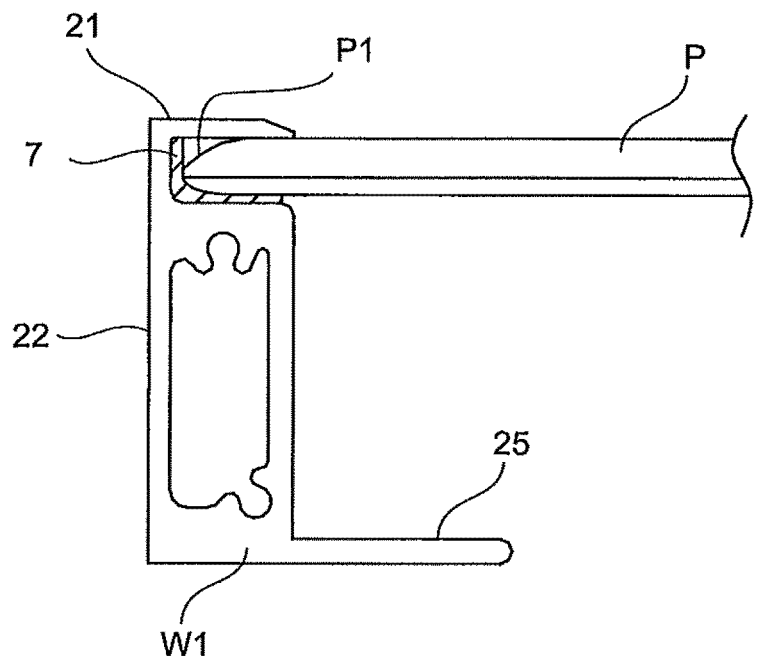
FIG. 19 is a cross-sectional view explaining a chamfering work for a light receiving surface side member.

Also, the light receiving surface side member 1 configured with a light-transmissive member such as a glass, polycarbonate resin, etc. may be chamfered at its edge portions. For example, as shown in FIG. 19, by forming a chamfered portion P1 at the light receiving surface side edge portions of the solar cell panel P by a rounding process and cutting process, the liquid flowing into the notch groove 27 can easily be discharged.

<<Third Embodiment>>

A solar cell module according to the third embodiment of the present invention will be explained with reference to FIGS. 20 to 25.

The present embodiment is characterized in that a projection portion is provided on at least a part of the exterior side surface of the module frame member such there is a predetermined gap between the solar cell module, and another member and the adjacent solar cell module. Note that the same configurations as those of the first embodiment are assigned the same reference numerals and the explanation therefor is omitted. The module frame member W1 to which the projection portion is formed will mainly be explained below.

Figure 20:
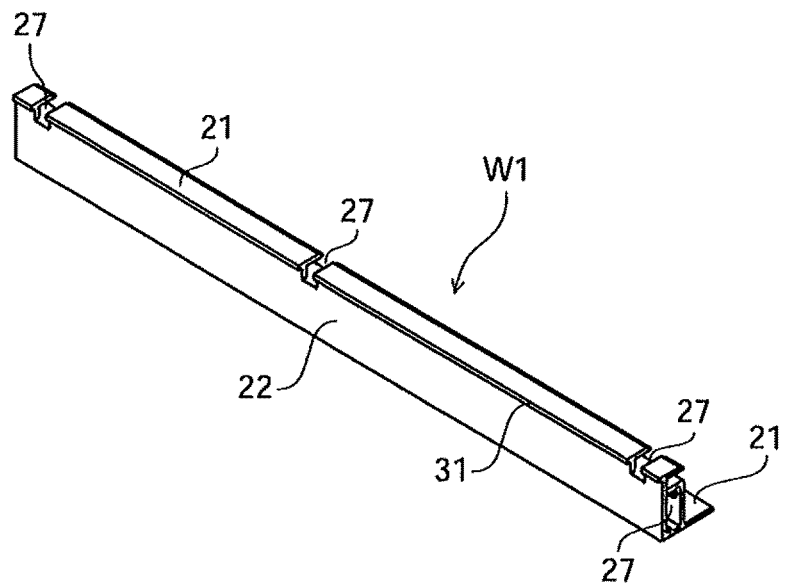
FIG. 20 is an external perspective view of a module frame member used in a third embodiment.
Figure 21:
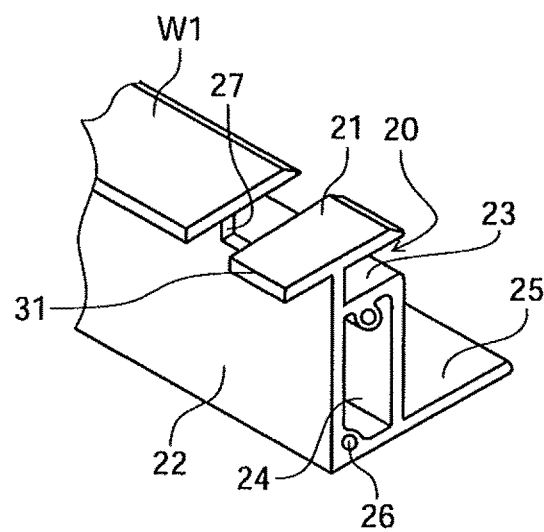
FIG. 21 is its main part enlarged perspective view.
Figure 22:
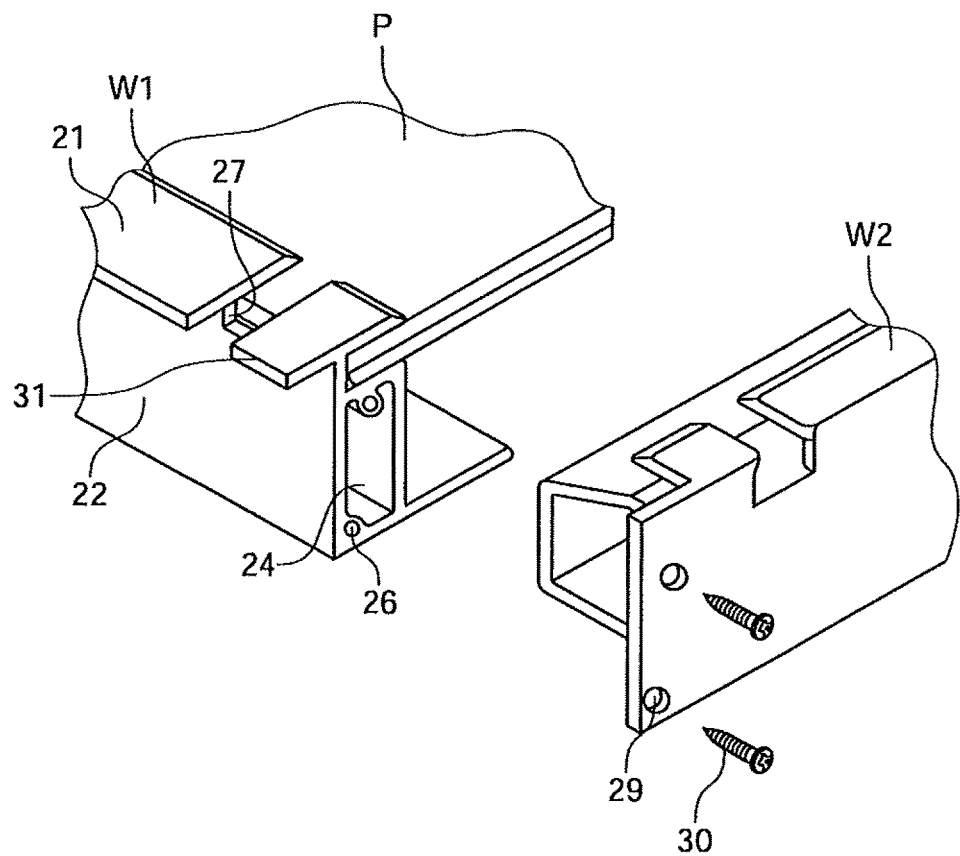
FIG. 22 is a schematic diagram showing that the solar cell panel is fitted into the module frame member according to the third embodiment of the present invention and is screwed to the adjacent module frame member.
Figure 23:
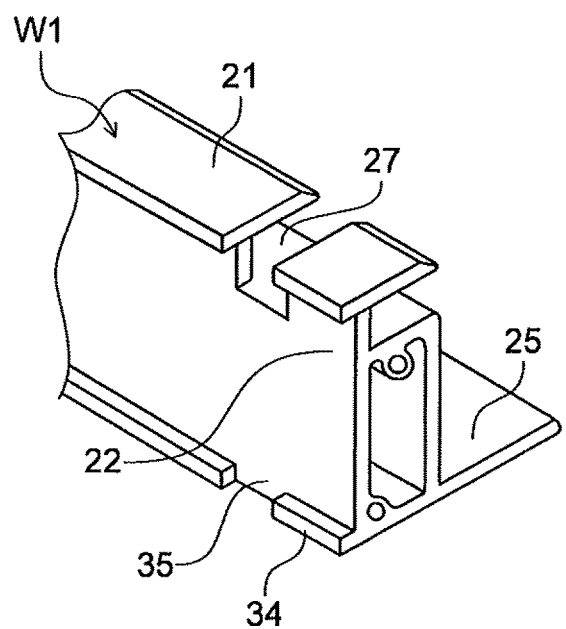
FIG. 23 is a main part enlarged perspective view showing the module frame member with a projection portion provided at the lower end portion thereof.

FIG. 20 is an external perspective view of a module frame member W1, among the module frame members mounted to the external peripheral of the solar cell panel P, that is mounted to the side that comes to the lower side of the inclined direction of the solar cell module when the solar cell module is set tilted. FIG. 21 is its partial enlarged perspective view. FIG. 22 is an external perspective view showing that the solar cell is mounted to this module frame member W1.

The module frame member W1 has the mounting portion 20 to which the external peripheral of the solar cell panel P is mounted, the notch groove 27, the setting portion 25, and the projection portion 31 which is outwardly projecting with respect to the side surface portion 22 of the module frame member W1. Also, the hollow portion 24 is formed between the mounting portion 20 and the setting portion 25.

The setting portion 25 that is provided to such a module frame member W1 is provided on the bottom portion of the module frame member W1, and is used to fix the solar cell module M to a base (not shown) or to a setting position, and is provided with a through-hole for a bolt to go therethrough for example, and is fixed to the base or the setting position using a bolt, nut, etc.

The mounting portion 20 comprises the upper surface portion 21, the side surface portion 22, the bottom surface portion 23, and each upper surface portion 21, side surface portion 22, and bottom surface portion 23 are processed integral with the module frame member W1. In other words, the upper surface portion 21 is a part of the upper structure of the module frame member W1 and the side surface portion 22 a part of the side surface of the module frame member W1.

The inner surface of the upper surface portion 21 is configured such that it abuts with or faces the end portion of the light receiving surface of the solar cell panel P, the inner surface of the side surface portion 22 is configured such that it abuts with or faces the end surface of the solar cell panel P in its thickness direction, and the inner surface of the bottom surface portion 23 is configured such that it abuts with or faces the rear surface of the end portion of the solar cell panel P. An adhesive member such as a butyl rubber is interposed on an abutted part and opposed part of the module frame member W1 and the solar cell panel P.

Note that the hollow portion 24 is formed between the mounting portion 20 and the setting portion 25, and a screw hole 26 is provided therein to fix a module frame member W2 relative to the module frame member W1 to which the solar cell panel P is mounted as shown in FIG. 22. Thereafter, the module frame member W1 to which the solar cell panel P is mounted mounts the module frame member W2 to one of the other external peripheral parts of the solar cell panel P, and the module frame member W1 and the module frame member W2 can be firmly fixed by a screw 30 via a screw hole 29 formed on the module frame member W2. In this manner, four module frame members W1 to W4 are fixed and the solar cell module M is completed.

For the solar cell module according to the present embodiment, the projection portion 31 that is outwardly projecting is formed at least on a part of the exterior side surface of the module frame member. In FIG. 22, for example, the projection portion 31 outwardly projecting with respect to the side surface of the member that configures the upper surface portion 21 is formed, and in FIG. 20, the projection part 31 is formed substantially along the length of the module frame member W1. With such configurations, when the solar cell module is set next to another solar cell module, the aforementioned projection portion plays a role as a cushioning material against the member adjacent to the projection portion. Also, by forming a predetermined space between the solar cell modules adjacent to each other, it is possible to improve the disposability of the liquid to the rear surface side of the solar cell module. In other words, the aforementioned space as well as the notch groove 27 play a role as a flow path of the liquid to the rear surface side of the solar cell module M.

Note that the module frame member may be made of aluminum or a resin, taking required strength and costs into consideration. For example, when it is made of aluminum, it is made by extruding aluminum. Further, alumite treatment or clear coating is performed on the external surface of the module frame members W1 to W4 thus prepared in order to improve the weather resistance. When using a resin, it may be made by injection molding. The forming of the notch groove 27 may be done by cutting the notch groove out by machining or punching it out by pressing to what is extruded or injection molded.

When the solar cell module M is set tiled, the notch grove 27 is provided at three positions, i.e. both ends and the center of module frame member W1 that comes to the lower side in the inclined direction of the solar cell module. In this manner, by forming the notch groove 27 at least at both ends, the liquid on the light receiving surface of the solar cell panel P can be discharged through either notch groove 27, even when the module frame member W1 is not set horizontally but is set tilted. Note that the notch groove 27 may be formed only on the upper surface portion 21 of the module frame member W1 or may be formed such that it further extends to the side surface portion 22. In this manner, the light receiving surface of the solar cell panel P leads to the rear surface side thereof through the notch groove 27 via the side surface of the module frame member W1.

Note that the module frame member W1 on which the notch groove 27 is formed may be set such that it becomes the side in the lower side of the inclining direction when arranging the solar cell module M. When it is difficult to specify the inclining direction when constructing the solar cell module M, it may be possible to form the notch groove 27 on the module frame members W1 and W2 that are mounted to the two sides of the solar cell panel P being perpendicular to each other, as the module frame member W2 in the FIG. 22 shows, or it may be possible to form the notch groove 27 on the module frame members W1 to W4, i.e. on all the sides, making the module frame member compatible.

<Variation>

As shown in FIG. 22, the projection portion 31 in the present embodiment is formed on the upper surface portion 21 of the module frame member W1. In addition, a projection portion 34 may be formed at the lower end portion of the side surface portion 22 of the module frame member W1. At this time, as mentioned earlier, a depression portion 35 serving as a flow path of the liquid may be formed at a part of the projection portion 34 at the lower end portion of the side surface portion side in order to steadily discharge the liquid to the rear surface side of the solar cell module M.

When such a solar cell module M is used for general houses or for other purposes, a plurality of solar cell modules are placed next to each other. Furthermore, they are set tilted at a predetermined angle in order to improve the light-receiving efficiency.

Figure 25:
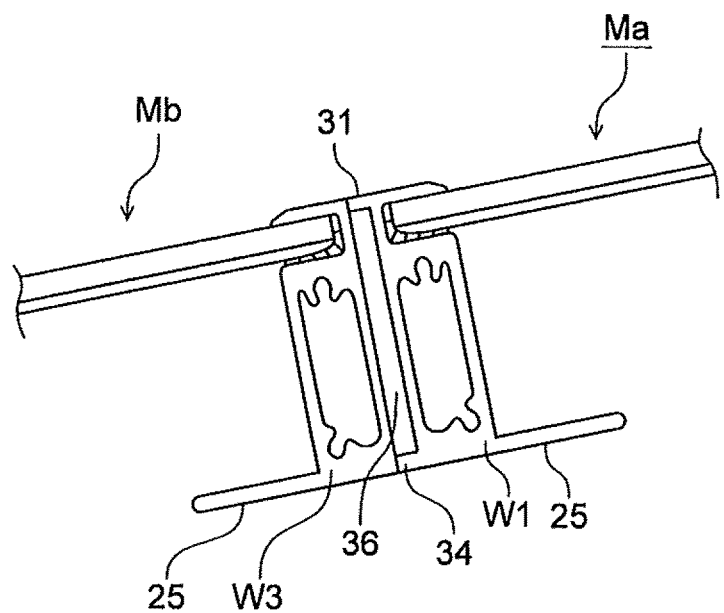
FIG. 25 is an enlarged view of an abutted part of a different solar cell module in the solar cell array according to the present invention.

FIG. 25 is a partial cross-sectional view of the solar cell array when a solar cell module Ma and a solar cell module Mb according to the present invention are set next to each other. In FIG. 25, the solar cell module Ma is the one in the upper side of the inclining direction, and the solar cell module Mb is the one in the lower side of the inclining direction. In other words, the module frame member W1 of the solar cell module Ma and the module frame member W3 of the solar cell module Mb are abutted.

Although the solar cell module Ma and the solar cell module Mb are abutted with each other, a gap 36 equivalent of the projection size of the projection portions 31 and 34 is formed on the side surface part of the module frame member W3 by the projection portions 31 and 34 formed on the module frame member W1 of the solar cell module Ma. Although not shown, the light receiving surface side communicates to the rear surface side of the solar cell module Ma by the notch groove 27 formed on the projection portions 31 and 34 of the solar cell module Ma (and/or the depression portion 35) through the gap 36. Therefore, the liquid on the solar cell module Ma on the upper side of the inclining direction is discharged to the rear surface side of the solar cell module Ma from the solar cell panel P through the notch groove, the gap 36 and the depression portion 35 of the projection portion 34, thus the liquid will not remain on the light receiving surface of the solar cell module Ma.

Although not shown, as for the solar cell module Mb positioned on the lower side of the inclining direction, the liquid is also steadily discharged from the module frame member W1 side of the solar cell module Mb.

In this manner, when it rains on the light receiving surface of the solar cell array A, the liquid containing dirt will not move to the solar cell module arranged in the lower side as was the case before, thus the solar cell module in the bottom row of the solar cell array A will not get dirty so badly.

The projection size of the projection portion 31 on the upper side of the module frame member W1 and the projection portion 34 on the lower side thereof, i.e. the width of the gap 36 may be approximately from 1.5 mm to 5 mm, and by steadily discharging the liquid to the solar cell modules Ma and Mb through the notch groove 27, it is least likely that the power generation capability of the solar cell array A decreases.

The projection portion 31 of the module frame member W1 outwardly projecting with respect to the solar cell module is preferably formed along the length direction of the module frame member W1 on its uppermost portion except for where the notch groove 27 is located, in order to prevent foreign objects such as leaves and dirt from getting into the gap 36. However, when the solar cell array A is set on the roof of a tall building where foreign objects are unlikely to get into, it is not necessary to provide the projection portion 31 on the uppermost part of the module frame member W1, and the projection portion 34 on the lower side may suffice. At the same time, the projection portion 31 or 34 may be provided intermittently along the length direction of the module frame member W1.

Figure 24:
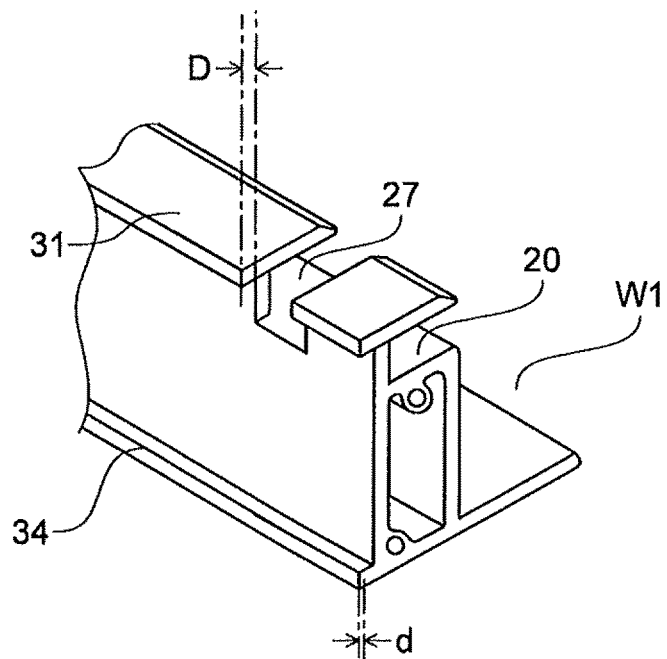
FIG. 24 is a main part enlarged perspective view showing another example of the module frame member with a projection portion provided at the lower end portion thereof.

As another variation, instead of forming the depression portion 35 on the projection portion 34 at the lower end portion as mentioned earlier, the projection portion 34 may be such that its projection size d is sufficiently smaller than the outward projection size D of the projection portion 31 at the upper end portion side as shown in FIG. 24.

In this manner, even when the solar cell modules M that are adjacent to each other are tilted and further arranged such that another solar cell module and the projection portion 31 at the upper end portion are abutted with each other, a gap sufficient for discharging the liquid and a drain by the notch groove are formed at the projection portion 34 at the lower end portion.

<<Fourth Embodiment>>

A solar cell module and a solar cell array using the same according to a fourth embodiment of the present invention will be explained with reference to FIGS. 26 to 31.
Note that the explanation for the same configurations as those of the first embodiment is omitted. Characteristic parts of the present embodiment will mainly be explained below. Different reference numerals are partly assigned to the same configurations as those of the aforementioned embodiments for convenience, but their details are the same.

Figure 26:
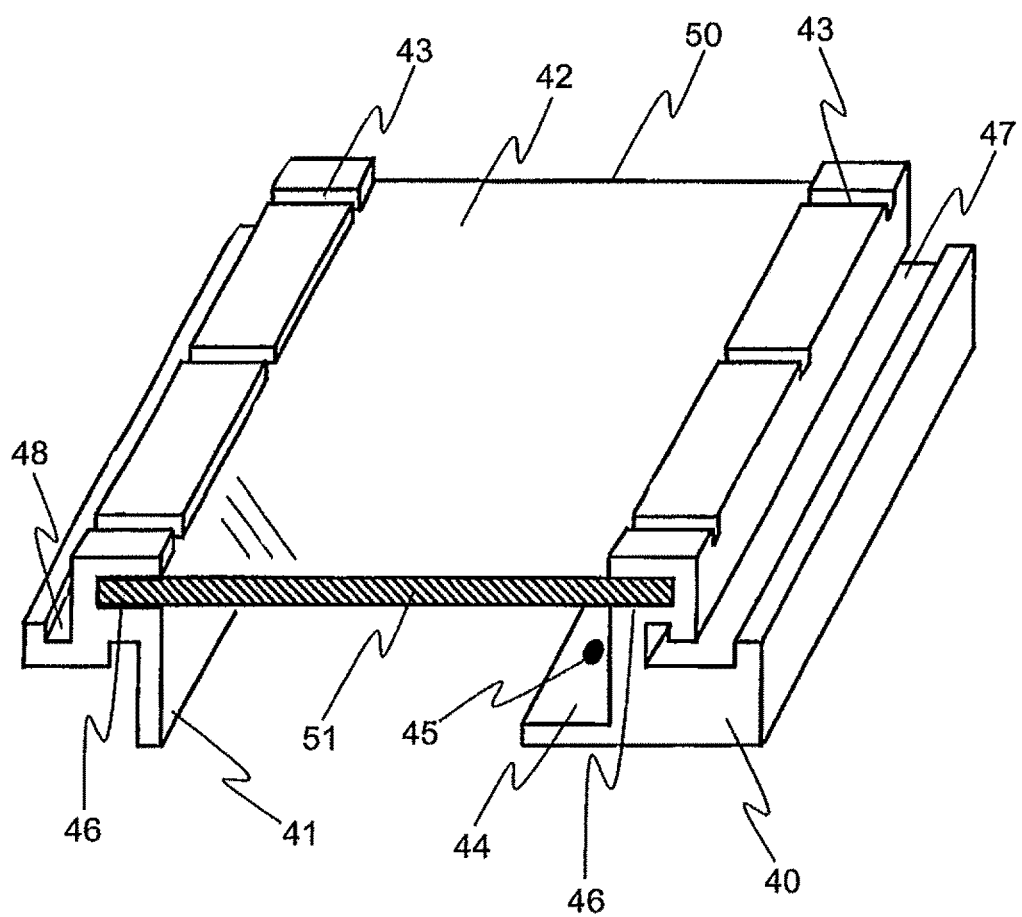
FIG. 26 is a perspective view of the solar cell module according to the present invention in which a pair of opposing frames are left and the other frames are removed.

FIG. 26 is a perspective view of the solar cell module according to the present invention in which a pair of opposing frames are left and the other frames are removed.
The solar cell module comprises module frame members 40 and 41, a solar cell panel 42, a notch groove 43, a setting portion 44, a through-hole for fixing 45, a U-shaped groove portion 46, and interlock portions 47 and 48. The other opposing end surface portions of the solar cell panel 42 are 50 and 51, respectively.

For the module frame members 40 and 41 according to the present invention, the notch groove 43 is provided by removing a portion having the width of approximately 2 mm to 15 mm from the upper surface portion of the U-shaped groove portion 46.

The present embodiment is characterized in that when the adjacent module frame members 40 and 41 are abutted with each other, the terminal end portions 5 of the notch grooves 43 thereof are arranged such that they are located at the corresponding position to each other. By configuring in this manner, the liquid existing on the light receiving surface of one solar cell module increases its flow rate and total amount as the liquid moves to the light receiving surface of the adjacent solar cell panel 42 through the notch groove 43 of each solar cell module, therefore dust and dirt are taken into the liquid effectively and are discharged to the outside of the solar cell array.

Figure 27:
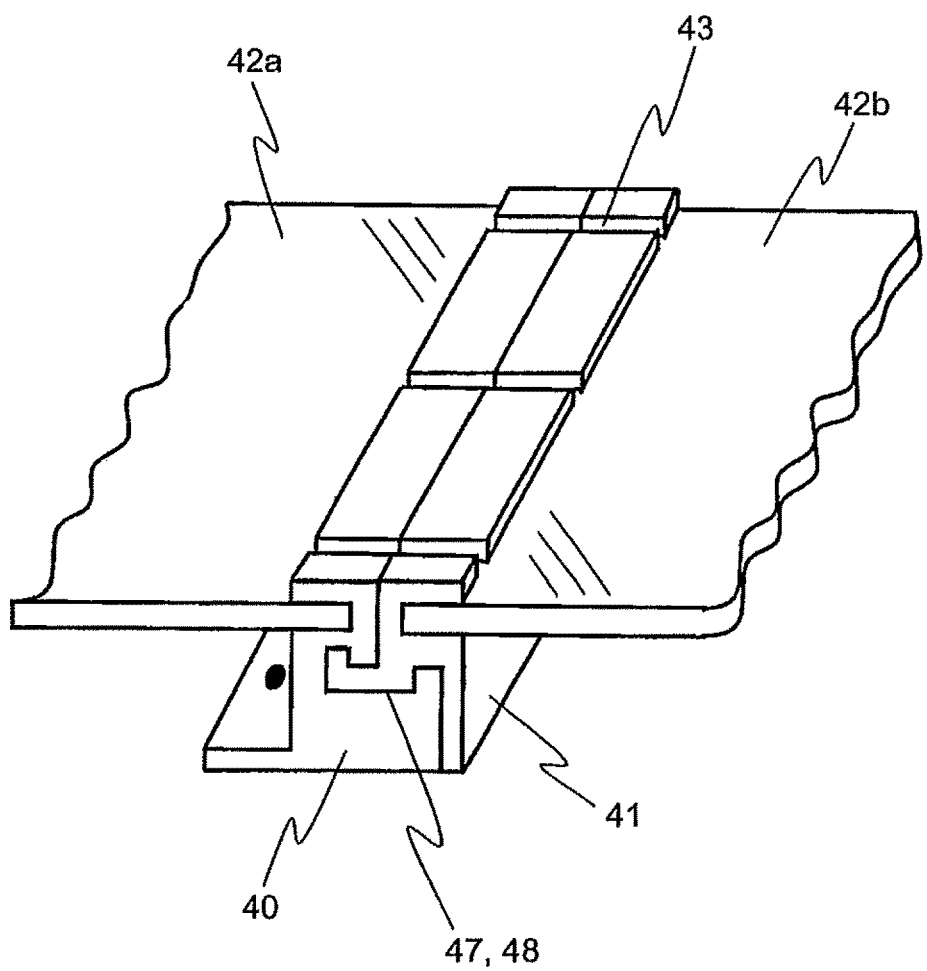
FIG. 27 shows a frame part when the solar cell module according to the present invention is set.

Next, as FIG. 27 shows, the interlock portions 47 and 48 are formed on the module frame members 40 and 41 so that the module frame members of the adjacent solar cell modules are interlocked, and the interlock portions 47 and 48 are shaped such that they are interlocked with each other by inserting the end portion of one module frame member to the other. Note that FIG. 27 shows that, similar to FIG. 26, a pair of opposing frames of the solar cell module are left and the other frames thereof are removed so that how the interlock portions 47 and 48 are interlocked is understood.

In FIG. 27, the module frame member 40 attached to the solar cell panel 42a is fixed to the base (not shown) using a bolt, nut, etc. and, the module frame member 41 attached to the solar cell panel 42b is slid into the module frame member 40 from the end surface thereof. By interlocking the module frame member 40 and the module frame member 41 in this manner, no big gap is created therebetween and further, the notch grooves 43 provided on the module frame member 40 and the module frame member 41 can be easily connected in continuity in a way as if there is only one groove.

Because the adjacent solar cell modules are fixed to each other at the interlock portions 47 and 48 provided on the module frame member 40 and 41, alignment of the terminal end portions 5 of the notch grooves 43 thereof can be easily done.

Further, the module frame member 40 attached to the solar cell panel 42a and the module frame member 41 attached to the solar cell panel 42b are interlocked by the interlock portions 47 and 48, therefore it is not necessary to fix the module frame member 41 to the base, thus reducing the number of working hours required for setting and the necessary members such as bolts and nuts. When the solar cell module of the solar cell panel 42a and the solar cell module of the solar cell panel 42b are set next to each other on the base in the vertical direction, the liquid is discharged through the continuous notch grooves 43 towards the lower side, and the liquid leaking to the rear surface side can be minimized, thus the base will not rust and its durability will be improved.

Figure 28:
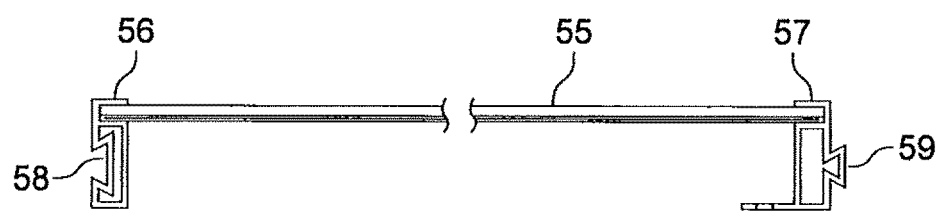
FIG. 28 shows a shape of another module frame of the solar cell module according to the present invention.
Figure 29:
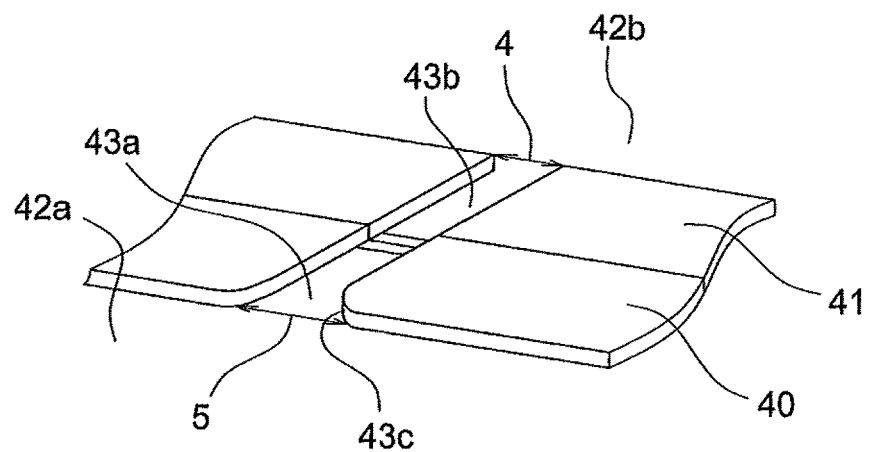
FIG. 29 is a main part enlarged perspective view showing one example of a notch groove structure.

Note that instead of the structure of the aforementioned interlock portions 47 and 48, the interlocking structure may be configured using interlock portions 58 and 59 of module frame members 56 and 57 as shown in FIG. 28. In this case, interlock portions 58 and 59 that interlock with the corresponding part on the module frame member of the adjacent solar cell module (not shown) are provided to the solar cell modules 56 and 57 mounted to a pair of opposing sides of the solar cell panel 55, and these interlock portions 58 and 59 are configured with a depression and projection having a trapezoidal shape, respectively.

<Variation of Notch Groove Structure of Adjacent Solar Cell Module>

In the present embodiment, when the notch grooves that are formed on the module frame members are configured in continuity between the adjacent solar cell panels, the continuous structure of the notch grooves is not limited to the aforementioned example, and structures explained below may also be possible.

<Variation 1>

Now, a case is considered where a solar cell module attached to a solar cell panel 42a and a solar cell module attached to a solar cell panel 42b are set tilted next to each other in the vertical direction. Here, an opening width of a notch groove 43b of the module frame member 41 of the solar cell module located at the upper side is uniformly formed, and a notch groove 43a of the module frame member of the solar cell module located at the lower side is chamfered at its edge portions on the inner periphery side. The notch groove 43b of the module frame member 41 and the notch groove 43a of the module frame member 40 are provided at a corresponding position to each other, and have the same opening width at the connecting part.

Therefore, the liquid existing on the light receiving surface of the solar cell panel 42b set at the upper side among the solar cell modules set in the vertical direction in continuity is discharged to the lower side through the notch groove 43b of the module frame member 41 and the notch groove 43a of the module frame member 40 of the solar cell module positioned at the lower side. At this time, because a terminal end portion 43e of the notch groove 43a is chamfered and its width is enlarged, the notch groove 43b at the solar cell panel 42b side functions as the draw part 4 in order to discharge the liquid existing on the light receiving surface side of the solar cell panel 42b, thus efficient discharge of the liquid becomes possible.

<Variation 2>

Figure 30:
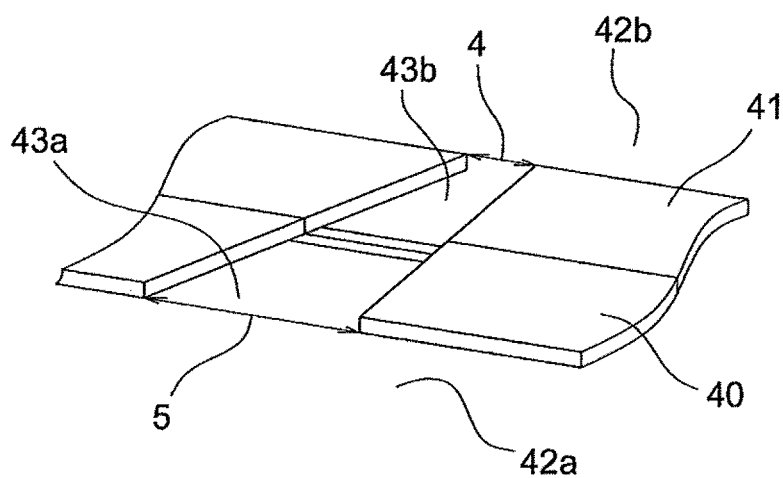
FIG. 30 is a main part enlarged perspective view showing one example of a notch groove structure.

A notch groove structure as shown in FIG. 30 may also be possible.

In this variation, a case is considered where a solar cell module attached to a solar cell panel 42a and a solar cell module attached to a solar cell panel 42b are set tilted next to each other in the vertical direction. Here, a notch groove 43b of the module frame member 41 of the solar cell module positioned at the upper side is formed such that its opening width enlarges from the inner periphery towards the external periphery, and a notch groove 43a of the module frame member of the solar cell module positioned at the lower side is formed such that its opening width enlarges from the external periphery towards the inner periphery. The notch groove 43b of the module frame member 41 and the notch groove 43a of the module frame member 40 are provided at a corresponding position to each other, and have the same opening width at the connecting part.

Therefore, the liquid existing on the light receiving surface of the solar cell panel 42b set at the upper side among the solar cell modules set in the vertical direction in continuity is discharged to the lower side through the notch groove 43b of the module frame member 41 and the notch groove 43a of the module frame member 40 of the solar cell module positioned at the lower side. At this time, the notch groove 43b at the solar cell panel 42b side functions as the draw part 4 in order to discharge the liquid existing on the light receiving surface side of the solar cell panel 42b, thus efficient discharge of the liquid becomes possible.

<Variation 3>

Figure 31:
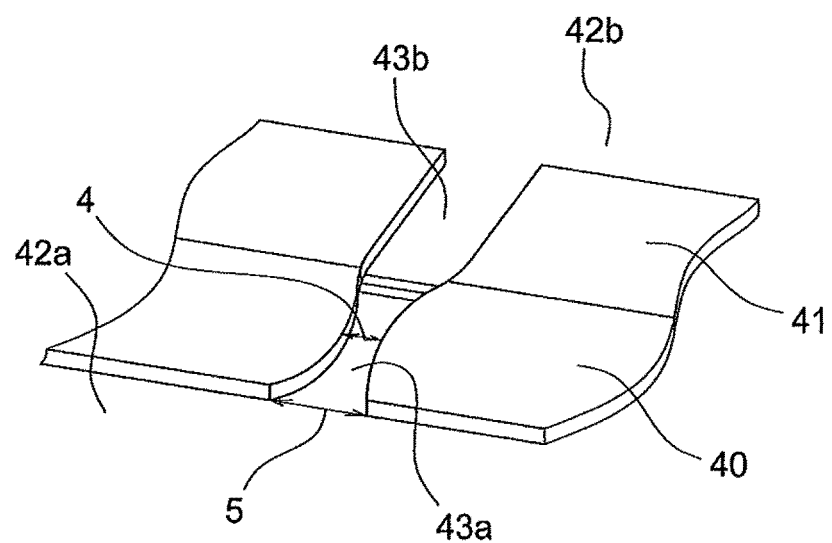
FIG. 31 is a main part enlarged perspective view showing one example of a notch groove structure.

Furthermore, a notch groove structure as shown in FIG. 31 may also be possible.

In this variation, a case is considered where a solar cell module attached to a solar cell panel 42a and a solar cell module attached to a solar cell panel 42b are set tilted next to each other in the vertical direction. Here, an opening width of a notch groove 43b of the module frame member 41 of the solar cell module located at the upper side is uniformly formed, and a notch groove 43a of the module frame member of the solar cell module located at the lower side is formed such that its opening width becomes smallest at its intermediate part. The notch groove 43b of the module frame member 41 and the notch groove 43a of the module frame member 40 are provided at a corresponding position to each other, and have the same opening width at the connecting part.

Therefore, the liquid existing on the light receiving surface of the solar cell panel 42b set at the upper side among the solar cell modules set in the vertical direction in continuity is discharged to the lower side through the notch groove 43b of the module frame member 41 and the notch groove 43a of the module frame member 40 of the solar cell module positioned at the lower side. At this time, the intermediate part of the notch groove 43a of the solar cell panel 42a side functions as the draw part 4 in order to discharge the liquid existing on the light receiving surface side of the solar cell panel 42b, thus efficient discharge of the liquid becomes possible.

<<Others>>

Note that the present invention is not limited to the aforementioned embodiments and various modifications and improvements, etc. can be made without departing from the scope of this invention.

Especially, it is needless to say that various characteristic parts in each embodiment described above can be configured in combination as necessary.

Note that the solar cell element is not limited to a crystalline solar cell such as single crystal or polycrystal silicon, but is also applicable to a thin-film solar cell by which the power generation capability decreases as the temperature rises.

Also, the present invention may have a configuration explained below.

<Damping System>

When the solar cell module (solar cell array) according to the present invention is set outside, even when the outside temperature is 20° C. during the power generation. the temperature of the solar cell module will rise to about 40° C. to 50° C. due to the heat generated by the operation of the solar cell element. When the temperature of the solar cell module rises in this manner, the power generation capability decreases due to the temperature characteristics of the solar cell element. When the temperature of the solar cell module rises up to 65° C. especially in summer, the power that is generated will be reduced to 80% of the power that is generated when the temperature of the solar cell module is 20° C.

It is effective to provide a water supply means that wets the surface of the solar cell module as a measure to deal with the temperature rise of the solar cell module.

Figure 32:
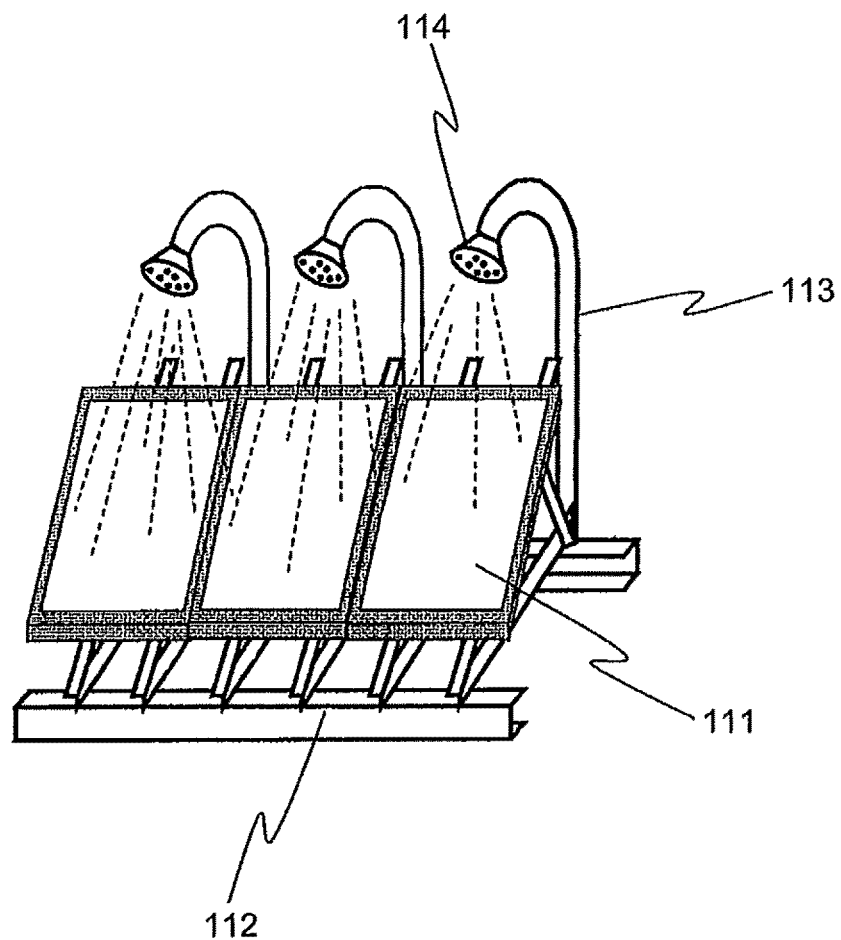
FIG. 32 shows one example of an external view of the solar cell module apparatus having a watering apparatus according to the present invention.

FIG. 32 shows one example of an external view of the solar cell module apparatus having a watering apparatus. In FIG. 32, reference numeral 111 is the solar cell module, 112 is a base for setting, 113 is the watering apparatus, and 114 is a watering nozzle.

As FIG. 32 shows, a pipe of the watering apparatus extends substantially vertically outside the solar cell module 111 that is set to the base 112, and its end portion is bent downward so that water is watered on the light receiving surface of the solar cell module 111 from the above, and the watering nozzle 114 is attached thereto. The watering nozzle has a conic shape so that water to be watered is spread at a predetermined angle, has holes formed on its bottom surface, and is made of metal such as stainless steel.

The base for setting 112 is to set and fix the solar cell module 111 at a predetermined angle, and is made from an iron angle to which a stainless or chrome treatment is performed.

Figure 33:
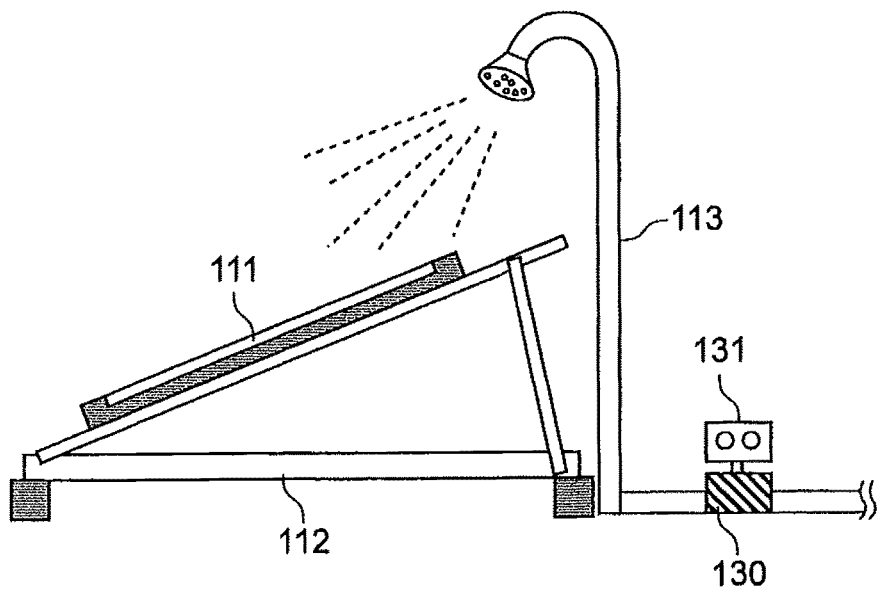
FIG. 33 is a schematic view showing a structure of the watering apparatus according to the present invention.

FIG. 33 is a schematic view showing a structure of the watering apparatus 113. In FIG. 33, a reference numeral 130 is a solenoid valve and 131 is a timer.

The watering apparatus 113 is characterized in that it intermittently waters on the light receiving surface side of the solar cell module 111. In other words, the solenoid valve 130 is interposed in a pipe of the watering apparatus 113, and the timer 131 controls the opening and closing of this solenoid valve 130. The timer 131 has a function whereby a cycle in which the solenoid valve 130 is opened for a preset time period and is closed for a preset time period is repeated.

By configuring the water apparatus 113 in this way, when the temperature of the solar cell module rises higher than 40° C. or 50° C. for example in summer, the solenoid valve 130 and the timer 131 are tuned on, thereby it becomes possible to water on the solar cell module 111 intermittently, thus preventing the decrease in the power generation capability of the solar cell module 111 as well as saving water to be watered.

In a case where the aforementioned watering apparatus is set to the solar cell array in which a plurality of solar cell modules are set, necessary electricity for driving the solenoid valve 130 and the timer 131 may be supplied by one of the solar cell modules.

In other words, a normally closed solenoid valve is used for the solenoid valve 130, and the power for the solenoid valve 130 and the timer 131 is supplied from one of the solar cell modules in the solar cell array. In this manner, because the solenoid valve 130 and the timer 131 are activated and water is automatically watered only when the solar cell module generates power by sunlight, the trouble of switching the solenoid valve 130 and the timer 131 on is saved, and also it becomes unnecessary to pull a utility power into a vicinity of the solar cell module.

Further, as a result of various tests conducted by the inventors of the present invention on a time period for watering and a time period for not watering, it is found that the temperature of the solar cell module 111 sharply drops after the watering is started, and the temperature thereof gradually rises after the watering is stopped.

Figure 34:
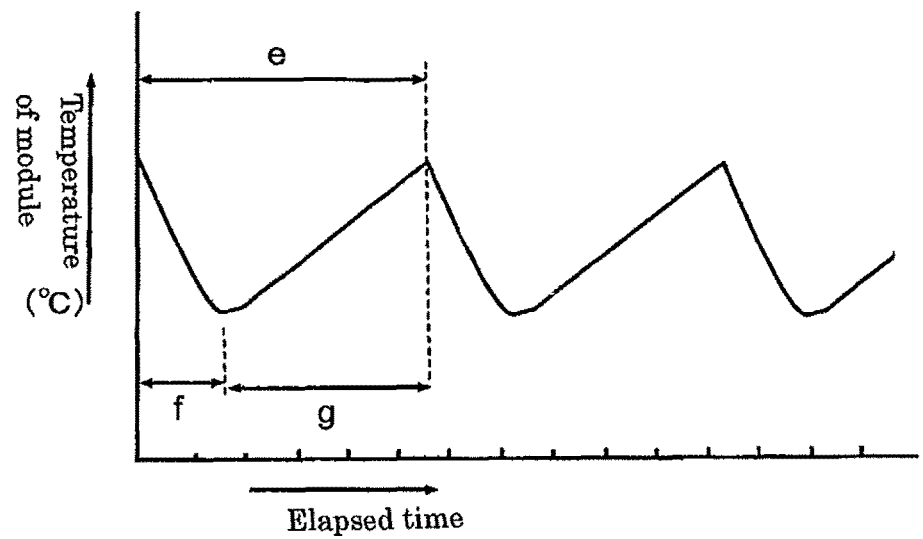
FIG. 34 is a graph showing a change of a temperature of the solar cell module when the watering apparatus according to the present invention is in operation.

FIG. 34 is a graph showing a change of the temperature of the solar cell module when the watering device is in operation. In FIG. 34, the horizontal axis indicates elapsed time, the vertical axis indicates a temperature of the solar cell module, e indicates one cycle of a time period in which the watering is intermittently operated by the watering apparatus and a time period in which the watering is stopped, f indicates a time period in which the watering apparatus is watering, and g indicates a time period in which the watering is stopped.

As FIG. 34 shows, the temperature of the solar cell module 111 sharply drops during the time period f in which the watering apparatus 113 is watering, and gradually rises during the time period g in which the watering is stopped. According to the test repeatedly conducted by the inventors using tap water and well water having the temperature from 15° C. to 25° C. for the watering, it is preferable that the time period e required for the aforementioned one cycle is more than 10 minutes but not more than 60 minutes, the time period f for the watering in the aforementioned cycle is more than 10% but not more than 30% of the time period of the aforementioned one cycle, and the amount of water to be watered per one square meter of the solar cell module is from 0.1 L to 5 L per minute.

In other words, when the time period e required for one cycle is less than 10 minutes, water cannot be watered sufficiently and the temperature drop of the solar cell module is small, thus the effect of the improvement of the power generation capability cannot be expected.

When the time period e required for one cycle exceeds 60 minutes, the temperature of the solar cell module rises to that of before the watering, thus the effect of the improvement of the power generation capability cannot be expected.

When the time period f for the watering in one cycle is less than 10% of the time period for the aforementioned one cycle, water cannot be watered sufficiently and the temperature drop of the solar cell module is small, thus the effect of the improvement of the power generation capability cannot be expected.

When the time period f for the watering in one cycle exceeds 30% of the time period for the aforementioned one cycle, the temperature of the solar cell module will not get any lower than the temperature when the time period f is 30% of the aforementioned one cycle, thus resulting in wasting water.

When the amount of water to be watered per one square meter of the solar cell module is less than 0.1 L per minute, water cannot be watered sufficiently and the temperature drop of the solar cell module is small, thus the effect of the improvement of the power generation capability cannot be expected.

When the amount of water to be watered per one square meter of the solar cell module exceeds 5 L per minute, the speed at which the temperature drops will not increase and the temperature will not get any lower than the temperature when water is watered at 5 L per minute, thus resulting in wasting water.

The watering apparatus explained above is used as a measure against the temperature rise as described, but may also be preferably used as a washing apparatus for washing the dust and dirt existing on the solar cell panel surface away. Also in this case, the notch groove in the aforementioned embodiments plays a role to effectively discharge the liquid used for washing.

<Hydrophilic Glass>

When a glass such as a white plate glass, tempered glass, double-tempered glass and heat reflecting glass is used for the light receiving surface side member 1 for the solar cell module (solar cell array) according to the present invention, it is desirable that the hydrophilicity of the glass is improved by performing an ozone treatment or irradiating ultraviolet rays on the light receiving surface of the glass.

Figure 35:
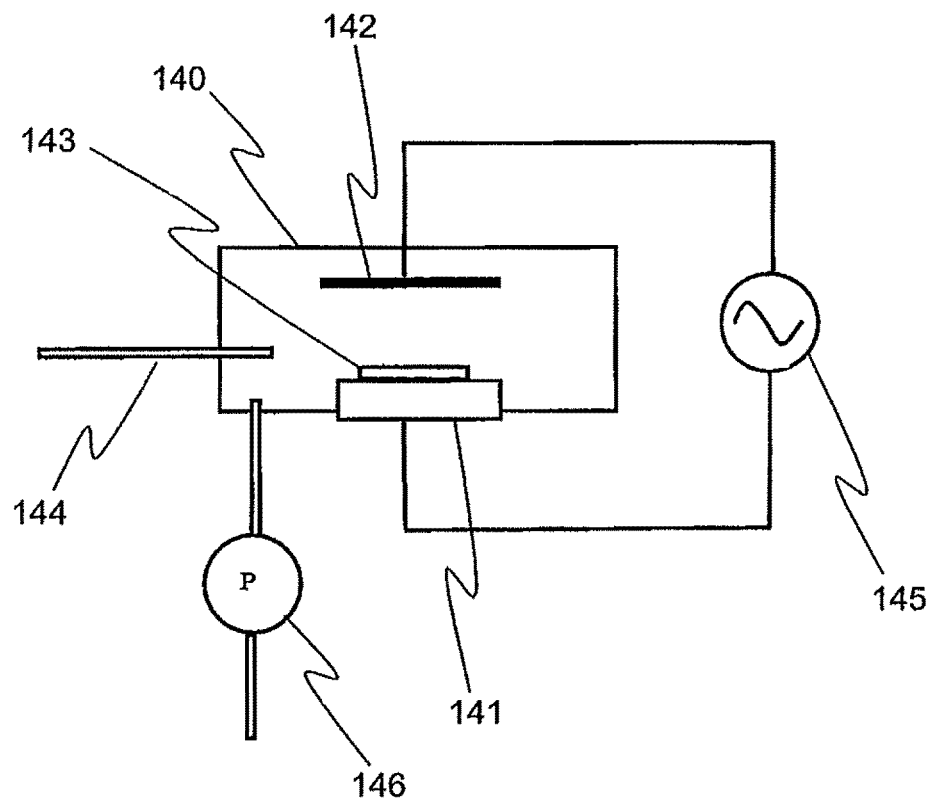
FIG. 35 is a cross-sectional view of an ozone treatment on a glass surface.

First, the explanation will be give on the ozone treatment with reference to FIG. 35.

FIG. 35 is a cross-sectional view showing the ozone treatment on a glass surface. A reference numeral 140 is a reaction chamber, 141 is an electrode table, 142 is an electrode plate, 143 is a glass, 144 is a gas inlet, 145 is a radio frequency source, and 146 is a vacuum pump.

The reaction chamber 140 of the ozone treatment apparatus is configured such that its upper part can be opened and closed, and the electrode table 141 and the electrode plate 142 are provided therein and are connected to the radio frequency source 145. Further, the gas inlet 144 is provided to the reaction chamber 140 and the vacuum pump is connected thereto.

The reaction chamber 140 of the ozone treatment apparatus is opened, and the glass 143 is placed on the electrode table 141 with its light receiving surface facing up. Thereafter, the reaction chamber 140 is closed and is decompressed by the vacuum pump 146. When the inside pressure reaches to a predetermined pressure, oxygen gas and nitrogen gas are injected into the reaction chamber 140 and the high frequency is applied thereto. In this way, the oxygen gas is decomposed and ozone is generated, thus generating an OH group, COOH group and CO group, as well as decomposing and removing organic matter deposited on the surface of the glass 143. The surface of the glass 143 is thus hydrophilized. Thereafter, the application of high frequency is stopped, the pressure inside the reaction chamber 140 is returned to atmospheric pressure, and the glass 143 is taken out therefrom.

Next, the irradiation of ultraviolet rays on the glass 143 that has been taken out is explained with reference to FIG. 36.

Figure 36:
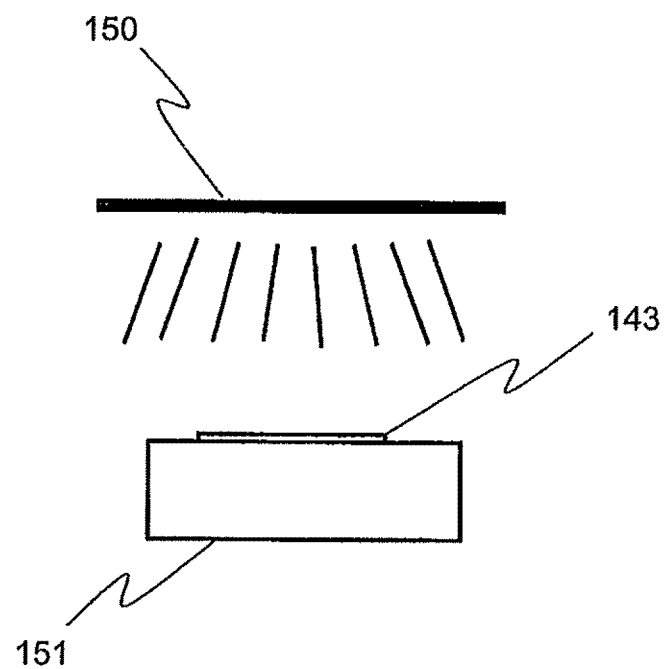
FIG. 36 is a view showing that ultraviolet rays are irradiated to the glass.

FIG. 36 shows how ultraviolet rays are irradiated on the glass 143. In FIG. 36, a reference numeral 150 is an ultraviolet lamp and 151 is an irradiation table. The glass 143 is placed on the irradiation table 151 with its light receiving surface facing up. Thereafter, the ultraviolet lamp 150 is turned on and ultraviolet rays are irradiated on the glass 143.

By irradiating ultraviolet rays on the surface of the glass 143 that has been hydrophilized by the ozone treatment, the aforementioned functional groups can be uniformly formed on the surface of the glass 143, thus further improving the hydrophilicity.

By hydrophilizing the light receiving surface of the solar cell module in an inexpensive way without using a photocatalyst such as titanium oxide as described above, the water watered by the watering apparatus without increasing the absorption of sunlight will not flow over the solar cell module surface in lines, but will be spread on the surface, thus prompting the evaporation of the water. Accordingly, the temperature of the solar cell module can be effectively lowered with a small amount of water.

Further, it is desirable that the solar cell module used for the solar cell module apparatus to which the aforementioned watering apparatus is set is provided with a projection portion outwardly projecting on the side surface of the module frame member, as well as providing a notch groove thereto that leads to the rear surface side of the solar cell panel from the light receiving surface side of the solar cell panel via the side surface of the module member. Accordingly, even when the watering is repeatedly performed by the watering device over a long period of time, the water that is watered is less likely to stay on the solar cell module and the water scale will not leave thereon, thus preventing the degradation of appearance and the decrease in power generation of the solar cell module.

The glass surface whose hydrophilicity is improved may be embossed in advance to increase its surface area so that the amount of water evaporation will increase, which is more effective.

What is claimed is:

1. A solar cell module comprising:
    a solar cell panel, and
    a module frame fixed to the solar cell panel and surrounding the solar cell panel,
    wherein the module frame has a mounting portion comprising an upper surface portion that is located on an upper side of an end portion of the solar cell panel, a side surface portion that is located on a side of a side surface of the solar cell panel, and a bottom surface portion that is located under a rear surface of the end portion of the solar cell panel; and a notch groove is provided to the mounting portion so that it extends from its inner part towards its external part in plan view from above,
    the notch groove comprises:
        a first portion on an upper surface of the module frame so as to expose an upper surface of the solar cell panel, and extending from the inner periphery of the upper surface of the module frame to the external periphery of the module frame,
        a second portion on an exterior side surface of the module frame connected to the first portion and extends so that a lower end portion of a side surface of the solar cell panel is exposed,
    an end portion of the second portion is located over a bottom surface of the module frame.

2. The solar cell module according to claim 1,
    wherein a width of the first portion is different from a width of the second portion.

3. The solar cell module according to claim 1,
    wherein a draw part with a small width is at the first portion.

4. The solar cell module according to claim 3,
    wherein a width of the first portion is discontinuous.

5. A solar cell array comprising a plurality of solar cell modules according to claim 1, wherein the plurality of solar cell modules are tilted to a base for setting.

6. The solar cell array comprising a plurality of solar cell modules according to claim 1,
    wherein the solar cell modules comprise a first solar cell module and a second solar cell module adjacent to the first solar cell module, and the notch of the first solar cell module is arranged to face the notch of the second solar cell module.

7. The solar cell module according to claim 1, further comprising:
    an adhesive member interposed between the mounting portion and the solar cell panel, wherein the adhesive member is positioned on the non-forming region of the notch groove.

* * * * *